(12) United States Patent
Johnson et al.

(10) Patent No.: US 12,315,873 B2
(45) Date of Patent: May 27, 2025

(54) SOLID-STATE BATTERY SEPARATOR INCLUDING LOW MELT TEMPERATURE INORGANIC ELECTROLYTE AND METHOD OF FABRICATING THE SAME

(71) Applicant: Johnson IP Holding, LLC., Atlanta, GA (US)

(72) Inventors: Lonnie G. Johnson, Atlanta, GA (US); David Johnson, Douglasville, GA (US)

(73) Assignee: JOHNSON IP HOLDING, LLC., Atlanta, GA (US)

( * ) Notice: Subject to any disclaimer, the term of this patent is extended or adjusted under 35 U.S.C. 154(b) by 13 days.

(21) Appl. No.: 16/918,647

(22) Filed: Jul. 1, 2020

(65) Prior Publication Data

US 2020/0335756 A1    Oct. 22, 2020

Related U.S. Application Data

(60) Division of application No. 16/109,295, filed on Aug. 22, 2018, now abandoned, which is a continuation of
(Continued)

(51) Int. Cl.
*H01M 10/0562* (2010.01)
*H01M 4/02* (2006.01)
(Continued)

(52) U.S. Cl.
CPC ......... *H01M 10/0562* (2013.01); *H01M 4/13* (2013.01); *H01M 4/134* (2013.01);
(Continued)

(58) Field of Classification Search
CPC ........ H01M 4/13; H01M 4/134; H01M 4/621; H01M 4/0411; H01M 4/043; H01M 4/131;
(Continued)

(56) References Cited

U.S. PATENT DOCUMENTS 3,237,078 A    2/1966 Mallory
3,393,355 A    7/1968 Whoriskey et al.
(Continued)

FOREIGN PATENT DOCUMENTS

CN    1866583 A    11/2006
CN    101434417 A    5/2009
(Continued)

OTHER PUBLICATIONS

Office Action issued Aug. 3, 2020 in CN Application No. 201680075318.3.
(Continued)

*Primary Examiner* — Sean P Cullen
(74) *Attorney, Agent, or Firm* — Panitch Schwarze Belisario & Nadel LLP

(57) ABSTRACT

Embodiments of solid-state batteries, battery components, and related construction methods are described. The components include one or more embodiments of a low melt temperature electrolyte bonded solid-state rechargeable battery electrode and one or more embodiments of a composite separator having a low melt temperature electrolyte component. Embodiments of methods for fabrication of solid-state batteries and battery components are described. These methods include co-extrusion, hot pressing and roll casting.

14 Claims, 7 Drawing Sheets

Related U.S. Application Data application No. 13/829,525, filed on Mar. 14, 2013, now Pat. No. 10,084,168.

(60) Provisional application No. 61/711,676, filed on Oct. 9, 2012.

(51) Int. Cl.

| | | |
|---|---|---|
| *H01M 4/04* | (2006.01) | |
| *H01M 4/13* | (2010.01) | |
| *H01M 4/131* | (2010.01) | |
| *H01M 4/134* | (2010.01) | |
| *H01M 4/139* | (2010.01) | |
| *H01M 4/1395* | (2010.01) | |
| *H01M 4/40* | (2006.01) | |
| *H01M 4/62* | (2006.01) | |
| *H01M 10/04* | (2006.01) | |
| *H01M 10/052* | (2010.01) | |
| *H01M 50/434* | (2021.01) | |
| *H01M 50/46* | (2021.01) | |

(52) U.S. Cl.
CPC ....... *H01M 4/621* (2013.01); *H01M 10/0436* (2013.01); *H01M 10/052* (2013.01); *H01M 50/434* (2021.01); *H01M 2004/027* (2013.01); *H01M 4/0411* (2013.01); *H01M 4/043* (2013.01); *H01M 4/131* (2013.01); *H01M 4/139* (2013.01); *H01M 4/1395* (2013.01); *H01M 4/405* (2013.01); *H01M 50/46* (2021.01); *H01M 2300/0068* (2013.01); *H01M 2300/0091* (2013.01); *Y02T 10/70* (2013.01)

(58) Field of Classification Search
CPC .... H01M 4/139; H01M 4/1395; H01M 4/405; H01M 10/0436; H01M 10/052; H01M 10/0562; H01M 50/431; H01M 50/46
USPC ..... 429/231.35, 304, 305, 231.95, 246, 247, 429/320, 322; 156/244.11; 427/58
See application file for complete search history.

(56) References Cited

U.S. PATENT DOCUMENTS

| | | | |
|---|---|---|---|
| 4,299,682 A | 11/1981 | Oda et al. | |
| 4,303,877 A | 12/1981 | Meinhold | |
| 4,352,068 A | 9/1982 | Weppner | |
| 4,386,020 A | 5/1983 | Hartwig et al. | |
| 4,419,421 A | 12/1983 | Wichelhaus et al. | |
| 4,495,078 A | 1/1985 | Bell et al. | |
| 4,513,069 A | 4/1985 | Kreuer et al. | |
| 4,526,855 A | 7/1985 | Hartwig et al. | |
| 4,614,905 A | 9/1986 | Petersson et al. | |
| 4,654,281 A | 3/1987 | Anderman et al. | |
| 4,704,341 A | 11/1987 | Weppner et al. | |
| 4,710,848 A | 12/1987 | Schlechtriemen et al. | |
| 4,719,401 A | 1/1988 | Altmejd | |
| 4,728,590 A | 3/1988 | Redey | |
| 4,777,119 A | 10/1988 | Brault et al. | |
| 4,792,752 A | 12/1988 | Schlechtriemen et al. | |
| 4,803,134 A | 2/1989 | Sammells | |
| 4,885,267 A | 12/1989 | Takahara et al. | |
| 4,931,214 A | 6/1990 | Worrell et al. | |
| 5,023,153 A | 6/1991 | Weppner | |
| 5,084,313 A | 1/1992 | Missig et al. | |
| 5,202,788 A | 4/1993 | Weppner | |
| 5,238,761 A | 8/1993 | Ryan | |
| 5,260,821 A | 11/1993 | Chu et al. | |
| 5,270,635 A | 12/1993 | Hoffman et al. | |
| 5,291,116 A | 3/1994 | Feldstein | |
| 5,314,765 A | 5/1994 | Bates | |
| 5,322,601 A | 6/1994 | Liu et al. | |
| 5,336,573 A | 8/1994 | Zuckerbrod et al. | |
| 5,338,625 A | 8/1994 | Bates et al. | |
| 5,362,581 A | 11/1994 | Chang et al. | |
| 5,387,857 A | 2/1995 | Honda et al. | |
| 5,411,592 A | 5/1995 | Ovshinsky et al. | |
| 5,432,026 A | 7/1995 | Sahm et al. | |
| 5,445,906 A | 8/1995 | Hobson et al. | |
| 5,455,126 A | 10/1995 | Bates et al. | |
| 5,474,959 A | 12/1995 | Schafer et al. | |
| 5,512,147 A | 4/1996 | Bates et al. | |
| 5,522,955 A | 6/1996 | Brodd | |
| 5,561,004 A | 10/1996 | Bates et al. | |
| 5,567,210 A | 10/1996 | Bates et al. | |
| 5,569,520 A | 10/1996 | Bates | |
| 5,582,623 A * | 12/1996 | Chu ................... | H01M 4/0414 |
| | | | 429/105 |
| 5,597,660 A | 1/1997 | Bates et al. | |
| 5,612,152 A | 3/1997 | Bates | |
| 5,654,084 A | 8/1997 | Egert | |
| 5,677,081 A | 10/1997 | Iwamoto et al. | |
| 5,705,293 A | 1/1998 | Hobson | |
| 5,778,515 A | 7/1998 | Menon | |
| 5,783,333 A | 7/1998 | Mayer | |
| 5,783,928 A | 7/1998 | Okamura | |
| 5,811,205 A | 9/1998 | Andrieu et al. | |
| 5,821,733 A | 10/1998 | Turnbull | |
| 6,022,642 A | 2/2000 | Tsukamoto et al. | |
| 6,136,472 A | 10/2000 | Barker et al. | |
| 6,139,986 A | 10/2000 | Kurokawa et al. | |
| 6,168,884 B1 | 1/2001 | Neudecker et al. | |
| 6,182,340 B1 | 2/2001 | Bishop | |
| 6,201,123 B1 | 3/2001 | Daikai et al. | |
| 6,242,129 B1 | 6/2001 | Johnson | |
| 6,255,122 B1 | 7/2001 | Duncombe et al. | |
| 6,387,563 B1 | 5/2002 | Bates | |
| 6,413,285 B1 | 7/2002 | Chu et al. | |
| 6,413,672 B1 | 7/2002 | Suzuki et al. | |
| 6,541,161 B1 | 4/2003 | Scanlon, Jr. | |
| 6,679,926 B1 | 1/2004 | Kajiura et al. | |
| 6,827,921 B1 | 12/2004 | Singhal et al. | |
| 6,852,139 B2 | 2/2005 | Zhang et al. | |
| 6,886,240 B2 | 5/2005 | Zhang et al. | |
| 6,887,612 B2 | 5/2005 | Bitterlich et al. | |
| 7,230,404 B2 | 6/2007 | Kimoto et al. | |
| 7,276,308 B2 | 10/2007 | Formanski et al. | |
| 7,510,800 B2 | 3/2009 | Yoshida et al. | |
| 7,524,580 B1 | 4/2009 | Birke et al. | |
| 7,540,886 B2 | 6/2009 | Zhang et al. | |
| 7,557,055 B2 | 7/2009 | Zhang et al. | |
| 7,674,559 B2 | 3/2010 | Min et al. | |
| 7,691,536 B2 | 4/2010 | Johnson | |
| 7,732,096 B2 | 6/2010 | Thackeray et al. | |
| 7,776,478 B2 | 8/2010 | Klaassen | |
| 7,824,795 B2 | 11/2010 | Yoshida et al. | |
| 7,901,658 B2 | 3/2011 | Weppner et al. | |
| 7,914,932 B2 | 3/2011 | Yoshida et al. | |
| 7,998,622 B2 | 8/2011 | Inda | |
| 8,092,941 B2 | 1/2012 | Weppner et al. | |
| 8,173,292 B2 | 5/2012 | Kato | |
| 8,192,869 B2 | 6/2012 | Teramoto | |
| 8,211,496 B2 | 7/2012 | Johnson et al. | |
| 8,221,916 B2 | 7/2012 | Inda | |
| 8,313,721 B2 | 11/2012 | Thackeray et al. | |
| 8,383,268 B2 | 2/2013 | Inda | |
| 8,431,287 B2 | 4/2013 | Teramoto | |
| 8,476,174 B2 | 7/2013 | Inda | |
| 8,568,921 B1 | 10/2013 | Johnson | |
| 8,778,546 B2 | 7/2014 | Farmer | |
| 8,795,868 B1 | 8/2014 | Miles | |
| 8,808,407 B2 | 8/2014 | Inda | |
| 8,822,077 B2 | 9/2014 | Katoh | |
| 8,852,816 B2 | 10/2014 | Ogasa | |
| 8,883,355 B2 | 11/2014 | Inda | |
| 8,951,681 B2 | 2/2015 | Katoh | |
| 9,034,525 B2 | 5/2015 | Babic et al. | |
| 9,153,838 B2 | 10/2015 | Ogasa | |
| 9,159,989 B2 | 10/2015 | Ogasa | |
| 9,178,255 B2 | 11/2015 | Kumar et al. | |
| 9,203,123 B2 | 12/2015 | Prochazka, Jr. et al. | |
| 9,263,770 B2 | 2/2016 | Boxley et al. | |

(56) References Cited

U.S. PATENT DOCUMENTS

| | | | |
|---|---|---|---|
| 9,266,780 B2 | 2/2016 | Ogasa | |
| 9,343,787 B2 | 5/2016 | Takechi et al. | |
| 9,379,375 B2 | 6/2016 | Sugiura et al. | |
| 9,385,405 B2 | 7/2016 | Murata et al. | |
| 9,413,033 B2 | 8/2016 | Ogasa | |
| 9,413,036 B2 | 8/2016 | Bhavaraju et al. | |
| 9,425,454 B2 | 8/2016 | Sugiura et al. | |
| 9,450,278 B2 | 9/2016 | Kim et al. | |
| 9,627,709 B2 | 4/2017 | Sastry et al. | |
| 9,680,191 B2 | 6/2017 | Lee et al. | |
| 9,711,822 B2 | 7/2017 | Nakashima et al. | |
| 9,917,304 B2 | 3/2018 | Lee et al. | |
| 9,954,260 B2 | 4/2018 | Ho | |
| 9,997,813 B2 | 6/2018 | Park et al. | |
| 10,218,044 B2 | 2/2019 | Johnson et al. | |
| 10,566,611 B2 | 2/2020 | Allie et al. | |
| 10,593,985 B2 | 3/2020 | Sastry et al. | |
| 10,686,224 B2 | 6/2020 | Angell et al. | |
| 10,693,170 B2 | 6/2020 | Jin et al. | |
| 10,734,686 B2 | 8/2020 | Robins et al. | |
| 10,797,340 B2 | 10/2020 | Lee et al. | |
| 2001/0014505 A1 | 8/2001 | Duncombe et al. | |
| 2001/0036578 A1 | 11/2001 | Nishida et al. | |
| 2002/0000541 A1 | 1/2002 | Sasaki et al. | |
| 2002/0008706 A1 | 4/2002 | Mayes et al. | |
| 2002/0119375 A1 | 8/2002 | Zhang | |
| 2003/0012996 A1 | 1/2003 | Bitterlich et al. | |
| 2003/0030039 A1 | 2/2003 | Sasaki et al. | |
| 2003/0118897 A1 | 6/2003 | Mino et al. | |
| 2003/0157407 A1 | 8/2003 | Kosuzu et al. | |
| 2004/0081888 A1 | 4/2004 | Thackeray et al. | |
| 2004/0101761 A1 | 5/2004 | Park et al. | |
| 2004/0111874 A1 | 6/2004 | Schierle-Arndt et al. | |
| 2004/0118700 A1 | 6/2004 | Schierle-Arndt et al. | |
| 2004/0151986 A1 | 8/2004 | Park et al. | |
| 2004/0159964 A1* | 8/2004 | Lavoie | H01M 4/0411 264/408 |
| 2004/0191617 A1 | 9/2004 | Visco et al. | |
| 2005/0084758 A1 | 4/2005 | Yamamoto et al. | |
| 2005/0095506 A1 | 5/2005 | Klaassen | |
| 2005/0100793 A1 | 5/2005 | Jonghe et al. | |
| 2005/0147890 A1 | 7/2005 | Shembel et al. | |
| 2005/0266150 A1 | 12/2005 | Yong et al. | |
| 2006/0046149 A1 | 3/2006 | Yong et al. | |
| 2006/0068282 A1 | 3/2006 | Kishi et al. | |
| 2006/0093916 A1 | 5/2006 | Howard et al. | |
| 2006/0165578 A1 | 7/2006 | Sasaki et al. | |
| 2006/0246355 A1 | 11/2006 | Min et al. | |
| 2006/0287188 A1 | 12/2006 | Borland et al. | |
| 2007/0031323 A1 | 2/2007 | Baik et al. | |
| 2007/0048617 A1 | 3/2007 | Inda | |
| 2007/0048619 A1* | 3/2007 | Inda | H01M 10/052 501/153 |
| 2007/0087269 A1 | 4/2007 | Inda | |
| 2007/0148545 A1 | 6/2007 | Amine et al. | |
| 2007/0148553 A1 | 6/2007 | Weppner | |
| 2007/0231704 A1 | 10/2007 | Inda | |
| 2007/0264579 A1 | 11/2007 | Ota | |
| 2008/0131781 A1 | 6/2008 | Yong et al. | |
| 2008/0220334 A1 | 9/2008 | Inda | |
| 2008/0241698 A1 | 10/2008 | Katoh | |
| 2008/0268346 A1 | 10/2008 | Inda | |
| 2009/0004371 A1 | 1/2009 | Johnson et al. | |
| 2009/0068563 A1 | 3/2009 | Kanda et al. | |
| 2009/0081554 A1 | 3/2009 | Takada et al. | |
| 2009/0081555 A1 | 3/2009 | Teramoto | |
| 2009/0092903 A1* | 4/2009 | Johnson | H01M 4/1391 429/322 |
| 2009/0098281 A1 | 4/2009 | Zhang et al. | |
| 2009/0142669 A1* | 6/2009 | Shinohara | H01M 10/0562 65/45 |
| 2009/0162755 A1 | 6/2009 | Neudecker | |
| 2009/0194222 A1 | 8/2009 | Teramoto | |
| 2009/0197178 A1 | 8/2009 | Inda | |
| 2009/0197182 A1 | 8/2009 | Katoh | |
| 2009/0214957 A1 | 8/2009 | Okada et al. | |
| 2009/0274832 A1* | 11/2009 | Inda | H01M 10/0525 427/77 |
| 2010/0028782 A1 | 2/2010 | Inda | |
| 2010/0047696 A1 | 2/2010 | Yoshida et al. | |
| 2010/0104948 A1 | 4/2010 | Skotheim et al. | |
| 2010/0203383 A1 | 8/2010 | Weppner | |
| 2010/0291443 A1 | 11/2010 | Farmer | |
| 2010/0308278 A1 | 12/2010 | Kepler et al. | |
| 2011/0053001 A1 | 3/2011 | Babic et al. | |
| 2011/0059369 A1 | 3/2011 | Nan et al. | |
| 2011/0076542 A1 | 3/2011 | Farmer | |
| 2011/0086274 A1 | 4/2011 | Chang et al. | |
| 2011/0133136 A1 | 6/2011 | Weppner et al. | |
| 2011/0177397 A1 | 7/2011 | Ogasa | |
| 2011/0209859 A1 | 9/2011 | Reinke et al. | |
| 2011/0223460 A1 | 9/2011 | Farmer | |
| 2011/0223467 A1 | 9/2011 | Shacklette et al. | |
| 2011/0223487 A1 | 9/2011 | Johnson et al. | |
| 2011/0300451 A1 | 12/2011 | Inda | |
| 2011/0318650 A1 | 12/2011 | Zhang et al. | |
| 2012/0100433 A1 | 4/2012 | Suyama et al. | |
| 2012/0141881 A1 | 6/2012 | Geier et al. | |
| 2012/0196189 A1 | 8/2012 | Babic et al. | |
| 2012/0237834 A1 | 9/2012 | Ogasa | |
| 2012/0251882 A1 | 10/2012 | Moon et al. | |
| 2012/0264021 A1 | 10/2012 | Sugiura et al. | |
| 2012/0270115 A1 | 10/2012 | Johnson | |
| 2013/0011751 A1 | 1/2013 | Nakada et al. | |
| 2013/0011752 A1 | 1/2013 | Tanaami et al. | |
| 2013/0017454 A1 | 1/2013 | Sato et al. | |
| 2013/0095394 A1 | 4/2013 | Tanaami et al. | |
| 2013/0157149 A1 | 6/2013 | Peled et al. | |
| 2013/0164616 A1 | 6/2013 | Nakada et al. | |
| 2013/0230777 A1 | 9/2013 | Babic et al. | |
| 2013/0273437 A1 | 10/2013 | Yoshioka et al. | |
| 2013/0309551 A1 | 11/2013 | Ogasa | |
| 2013/0344416 A1 | 12/2013 | Sakamoto et al. | |
| 2014/0008006 A1 | 1/2014 | Lee et al. | |
| 2014/0011080 A1 | 1/2014 | Lee et al. | |
| 2014/0011095 A1 | 1/2014 | Lee et al. | |
| 2014/0023933 A1 | 1/2014 | Chiga et al. | |
| 2014/0038058 A1 | 2/2014 | Holzapfel et al. | |
| 2014/0065456 A1 | 3/2014 | Bhavaraju et al. | |
| 2014/0099538 A1 | 4/2014 | Johnson et al. | |
| 2014/0099556 A1 | 4/2014 | Johnson et al. | |
| 2014/0287305 A1 | 9/2014 | Wachsman et al. | |
| 2015/0037688 A1 | 2/2015 | Otsuka et al. | |
| 2015/0056518 A1 | 2/2015 | Babic et al. | |
| 2015/0056520 A1 | 2/2015 | Thokchom et al. | |
| 2015/0099187 A1 | 4/2015 | Cui et al. | |
| 2015/0099197 A1 | 4/2015 | Nakashima et al. | |
| 2015/0333307 A1 | 11/2015 | Thokchom et al. | |
| 2016/0028133 A1 | 1/2016 | Miles | |
| 2016/0036109 A1 | 2/2016 | Kim et al. | |
| 2016/0043429 A1* | 2/2016 | Hatta | H02J 7/0068 429/188 |
| 2016/0149261 A1 | 5/2016 | Zaghib et al. | |
| 2016/0164153 A1 | 6/2016 | Kim et al. | |
| 2016/0181657 A1 | 6/2016 | Kawaji et al. | |
| 2016/0329539 A1 | 11/2016 | Kawaji et al. | |
| 2016/0336583 A1 | 11/2016 | Smith et al. | |
| 2017/0179472 A1 | 6/2017 | Allie et al. | |
| 2017/0179521 A1 | 6/2017 | Sakamoto et al. | |
| 2017/0214106 A1 | 7/2017 | Johnson et al. | |
| 2017/0222287 A1 | 8/2017 | Suzuki et al. | |
| 2017/0271682 A1* | 9/2017 | Matsuno | H01M 10/24 |
| 2019/0296276 A1 | 9/2019 | Bradwell et al. | |
| 2019/0372148 A1 | 12/2019 | He et al. | |
| 2021/0218091 A1 | 7/2021 | Uddin et al. | |
| 2021/0265616 A1 | 8/2021 | Kim et al. | |

FOREIGN PATENT DOCUMENTS

| | | |
|---|---|---|
| CN | 101494299 A | 7/2009 |
| CN | 102214827 A | 10/2011 |
| CN | 102013536 B | 10/2012 |
| CN | 102934279 A | 2/2013 |
| CN | 104245624 A | 12/2014 |

(56) References Cited

FOREIGN PATENT DOCUMENTS

| | | |
|---|---|---|
| CN | 105322250 A | 2/2016 |
| CN | 206048735 U | 3/2017 |
| CN | 107112595 A | 8/2017 |
| CN | 107204410 A | 9/2017 |
| CN | 107437636 A | 12/2017 |
| CN | 206921981 U | 1/2018 |
| CN | 207413450 U | 5/2018 |
| CN | 109075412 A | 12/2018 |
| DE | 4309070 A1 | 9/1994 |
| DE | 102004010892 B3 | 11/2005 |
| DE | 102007030604 A1 | 1/2009 |
| DE | 102010019187 A1 | 11/2011 |
| DE | 102015220354 A1 | 4/2017 |
| EP | 0070020 A1 | 1/1983 |
| EP | 0033935 B1 | 8/1985 |
| EP | 0177062 A2 | 4/1986 |
| EP | 0190605 A2 | 8/1986 |
| EP | 0206339 A2 | 12/1986 |
| EP | 0226955 A2 | 7/1987 |
| EP | 0232513 A2 | 8/1987 |
| EP | 0243975 A2 | 11/1987 |
| EP | 0249802 A2 | 12/1987 |
| EP | 238383 B1 | 8/1989 |
| EP | 0408039 A2 | 1/1991 |
| EP | 0227996 B1 | 7/1991 |
| EP | 0470597 A2 | 2/1992 |
| EP | 0693581 B1 | 5/1998 |
| EP | 1271683 A2 | 1/2003 |
| EP | 1431422 A1 | 6/2004 |
| EP | 1431423 A1 | 6/2004 |
| EP | 1237212 A3 | 4/2005 |
| EP | 2037527 A1 | 3/2009 |
| EP | 2086040 A2 | 8/2009 |
| EP | 2181971 A1 | 5/2010 |
| EP | 2685551 A1 | 1/2014 |
| EP | 2706598 A1 | 3/2014 |
| EP | 2903060 A1 | 8/2015 |
| FR | 2466107 A1 | 3/1981 |
| GB | 1329688 A | 9/1973 |
| GB | 1599792 A | 10/1981 |
| GB | 2226441 B | 12/1992 |
| JP | 8628452 A | 1/1987 |
| JP | H05-310417 A | 11/1993 |
| JP | H07235291 A | 9/1995 |
| JP | H10-97811 A | 4/1998 |
| JP | 2000311710 A | 11/2000 |
| JP | 2000331680 A | 11/2000 |
| JP | 2000331684 A | 11/2000 |
| JP | 2001126757 A | 5/2001 |
| JP | 2001126758 A * | 5/2001 |
| JP | 2001-243954 A | 9/2001 |
| JP | 2003132921 A | 5/2003 |
| JP | 2004127613 A | 4/2004 |
| JP | 2004213938 A | 7/2004 |
| JP | 2006260887 A | 9/2006 |
| JP | 2006261008 A * | 9/2006 |
| JP | 2006310295 A | 11/2006 |
| JP | 2008505458 A | 2/2008 |
| JP | 2009176741 A | 8/2009 |
| JP | 2010033918 A * | 2/2010 |
| JP | 2010067499 A | 3/2010 |
| JP | 2010080426 A | 4/2010 |
| JP | 2010129190 A | 6/2010 |
| JP | 2010132533 A | 6/2010 |
| JP | 2010244729 A | 10/2010 |
| JP | 2011134675 A | 7/2011 |
| JP | 2011150817 A | 8/2011 |
| JP | 2011249254 A | 12/2011 |
| JP | 2012003940 A | 1/2012 |
| JP | 2012099315 A | 5/2012 |
| JP | 2012146479 A | 8/2012 |
| JP | 2013037992 A | 2/2013 |
| JP | 2013157084 A | 8/2013 |
| JP | 2013532359 A | 8/2013 |
| JP | 2015013775 A | 1/2015 |
| JP | 2015138741 A | 7/2015 |
| JP | 2015144061 A | 8/2015 |
| JP | 2015204215 A | 11/2015 |
| JP | 2015534243 A | 11/2015 |
| JP | 2015230801 A | 12/2015 |
| JP | 2019503059 A | 1/2019 |
| KR | 20140006046 A | 1/2014 |
| KR | 10-2017-0056014 A | 5/2017 |
| KR | 10-2018-0104078 A | 9/2018 |
| RU | 2126192 C1 | 2/1999 |
| WO | 2005085138 A1 | 9/2005 |
| WO | 2006005066 A2 | 1/2006 |
| WO | 2006019245 A1 | 2/2006 |
| WO | 2007004590 A1 | 1/2007 |
| WO | 2007075867 A2 | 7/2007 |
| WO | 2009003695 A2 | 1/2009 |
| WO | 2009029746 A1 | 3/2009 |
| WO | 2011007445 A1 | 1/2011 |
| WO | 2011125481 A1 | 10/2011 |
| WO | 2011150528 A1 | 12/2011 |
| WO | 2011154869 A2 | 12/2011 |
| WO | 2011156392 A1 | 12/2011 |
| WO | 2012008422 A1 | 1/2012 |
| WO | 2012016606 A1 | 2/2012 |
| WO | 2012018831 A1 | 2/2012 |
| WO | 2012128374 A1 | 9/2012 |
| WO | 2012144553 A1 | 10/2012 |
| WO | 2013049460 A1 | 4/2013 |
| WO | 2013085557 A1 | 6/2013 |
| WO | 2013130983 A2 | 9/2013 |
| WO | 2013131005 A2 | 9/2013 |
| WO | 2014058683 A1 | 4/2014 |
| WO | 2014058684 A2 | 4/2014 |
| WO | 2015007680 A1 | 1/2015 |
| WO | 2015104538 A1 | 7/2015 |
| WO | 2015128982 A1 | 9/2015 |
| WO | 2015151144 A1 | 10/2015 |
| WO | 2016060757 A1 | 4/2016 |
| WO | 2016102373 A1 | 6/2016 |
| WO | 2016116400 A1 | 7/2016 |
| WO | 2016141765 A1 | 9/2016 |
| WO | 2017127485 A1 | 7/2017 |
| WO | 2020225313 A1 | 11/2020 |

OTHER PUBLICATIONS

Office Action issued Aug. 9, 2021 in U.S. Appl. No. 12/198,421, by Johnson.
Wohrle et al., "Sol-Gel Synthesis of the Lithium-Ion Conducting Perovskite La0.57Li0.3TiO3 Effect of Synthesis and Thermal Treatments on the Structure and Conducting Properties," Ionics, vol. 2, pp. 442-445 (1996).
Office Action issued Aug. 21, 2020 in U.S. Appl. No. 12/198,421, by Johnson.
Adachi et al., "Ionic Conducting Lanthanide Oxides," Chem. Rev., vol. 102, pp. 2405-2429 (2002).
Office Action issued Sep. 28, 2020 in JP Application No. 2019173287.
Xu et al., "Structures of Orthoborate Anions and Physical Properties of Their Lithium Salt Nonaqueous Solutions," Journal of The Electrochemical Society, vol. 150, No. 1, pp. E74-E80 (2003).
Office Action issued Nov. 16, 2021 in CN Application No. 201680075318.3.
Office Action issued Mar. 26, 2021 in CN Application No. 201680075318.3.
Decision to Grant issued Nov. 24, 2020 in KR Application No. 1020187020835.
Int'l Search Report and Written Opinion issued Apr. 23, 2014 in Int'l Application No. PCT/US2013/063161.
Int'l Search Report and Written Opinion issued Aug. 15, 2013 in Int'l Application No. PCT/US2013/028672.
Int'l Search Report and Written Opinion issued Aug. 22, 2013 in Int'l Application No. PCT/US2013/028633.
Int'l Search Report issued Feb. 17, 2017 in Int'l Application No. PCT/US2016/068105 (Partial).
Int'l Search Report issued Apr. 12, 2017 in Int'l Application No. PCT/US2016/068105 (Complete).

(56) References Cited

OTHER PUBLICATIONS

Jena et al, "Studies on the Ionic Transport and Structural Investigations of La0.5Li0.5TiO3 Perovskite Synthesized by Wet Chemical Methods and the Effect of Ce, Zr Substitution at Ti site," Journal of Materials Science, vol. 40, pp. 4737-4748 (2005).
Jin et al, "Al-doped Li7La3Zr2O12 synthesized by a polymerized complex method," Journal of Power Sources, vol. 196, pp. 8683-8687 (2011).
Jin et al, "All-Solid-State Rechargeable Lithium Ion Battery Fabrication with Al-Doped Li7La3Zr2O12 Solid Electrolyte," Retrieved from <http://international.dep.anl.gov/Postdocs/Symposium/Program/Presentations/32.pdf>, Download date: Oct. 8, 2012, original posting date: unknown, 1 page.
Jin et al, "Bulk solid state rechargeable lithium ion battery fabrication with Al-doped Li7La3Zr2O12 electrolyte and Cu0.1V2O5 cathode," Electrochimica Acta, vol. 89, pp. 407-412 (2013).
Jin, "Processing and characterization of secondary solid-state Li-Ion batteries," Dissertation submitted to the University of Notre Dame (Apr. 2013).
Jinlian et al, "Enhanced high temperature performance of LiMn2O4 coated with Li3BO3 solid electrolyte," Bull. Mater. Sci., vol. 36, No. 4, pp. 687-691 (2013).
Kanamura et al., "Three Dimensionally ordered composite solid materials for all solid-state rechargeable lithium batteries" Journal of Power Sources, 146, pp. 86-89, 2005.
Khatun et al., Impact of Lithium Composition on Structural, Electronic and Optical Properties of Lithium Cobaltite Prepared by Solid-state Reaction Journal of Scientific Research, vol. 6, No. 2, pp. 217-231 (2014).
Kim et al, "Characterization of the Interface Between LiCoO2 and Li7La3Zr2O12 in an All-Solid-State Rechargeable Lithium Battery," Journal of Power Sources, vol. 196, pp. 764-767 (2011).
Kishida et al, "Microstructure of the LiCoO2 (cathode)/La2/3-xLi3xTiO3 (electrolyte) Interface and its Influences on the Electrochemical Properties," Acta Materialia, vol. 55, No. 14, pp. 4713-4722 (2007).
Kitaoka et al, "Preparation of La0.5Li0.5TiO3 Perovskite Thin Films by the Sol-Gel Method," Journal of Materials Science, vol. 32, pp. 2063-2070 (1997).
Kobayashi et al, "All-Solid-State Lithium Secondary Battery with Ceramic/Polymer Composite Electrolyte," Solid State Ionics, vol. 152-153, pp. 137-142 (2002).
Kokal et al, "Sol-gel Synthesis and Lithium Ion Conductivity of Li7La3Zr2O12 with a Garnet-Related Type Structure," Solid State Ionics, vol. 185, pp. 42-46 (2011).
Kotobuki et al, "Fabrication of All-Solid-State lithium battery using novel garnet type electrolyte," ECS Meeting Abstracts (2010).
Kotobuki et al, "Fabrication of Three-Dimensional Battery Using Ceramic Electrolyte with Honeycomb Structure by Sol-Gel Process," Journal of The Electrochemical Society, vol. 157, No. 4, pp. A493-A498 (2010).
Kotobuki et al., "Compatibility of Li7La3Zr2O12 Solid Electrolyte to All-Solid-State Battery Using Li Metal Anode," Journal of The Electrochemical Society, vol. 157, No. 10, pp. A1076-A1079 (2010).
Kreiter et al, "Sol-gel Routes for Microporous Zirconia and Titania Membranes," J. Sol-Gel Sci. Technol., vol. 48, pp. 203-211 (2008).
Laughlin et al, "Using Sol-Gel Chemistry to Synthesize a Material with Properties Suited for Chemical Sensing," Journal of Chemical Education, vol. 77, No. 1, pp. 77-78 (2000).
Lee et al, "The Production of LiCoO2 Cathode Thick Films for an All-Solid-State Microbattery," Journal of Ceramic Processing Research, vol. 8, No. 2, pp. 106-109 (2007).
Li et al, "Physical and Electrochemical Characterization of Amorphous Lithium Lanthanum Titanate Solid Electrolyte Thin-Film Fabricated by e-beam Evaportation," Thin Solid Films, vol. 515, pp. 1886-1892 (2006).
Li et al, "Synthesis and Characterization of Li ion Conducting La2/3-xLi3xTiO3 by a Polymerizable Complex Method," Ceramics International, vol. 33, pp. 1591-1595 (2007).

Liu et al., "Enhanced high temperature performance of LiMn2O4 coated with Li3BO3 solid electrolyte," Bull. Mater. Sci., vol. 36, No. 4, pp. 687-691 (2013).
Machida et al, "All-Solid-State Lithium Battery with LiCo0.3Ni0.7O2 Fine Powder as Cathode Materials with an Amorphous Sulfide Electrolyte," Journal of The Electrochemical Society, vol. 149, No. 6, pp. A688-A693 (2002).
Maqueda et al, "Structural, Microstructural and Transport Properties Study of Lanthanum Lithium Titanium Perovskite Thin Films Grown by Pulsed Laser Deposition," Thin Solid Films, vol. 516, pp. 1651-1655 (2008).
Mateishina et al, "Solid-State Electrochemical Lithium Cells with Oxide Electrodes and Composite Solid Electrolyte," Russian Journal of Electrochemistry, vol. 43, No. 5, pp. 606-608 (2007).
Meda et al, "Lipon Thin Films Grown by Plasma-Enhanced Metalorganic Chemical Vapor Deposition in a N2—H2—Ar Gas Mixture," Thin Solid Films, vol. 520, pp. 1799-1803 (2012).
Mei et al, "Role of amorphous boundary layer in enhancing ionic conductivity of lithium-lanthanum-titanate electrolyte," Electrochimica Acta, vol. 55, pp. 2958-2963 (2010).
Munshi, "Handbook of Solid State Batteries & Capacitors," World Scientific, Chapters 10-12 (1995).
Murugan et al, "Fast Lithium Ion Conduction in Garnet-Type Li7La3Zr2O12," Angewandte Chemie International Edition, vol. 46, pp. 7778-7781 (2007).
Nagata et al, "All Solid Battery with Phosphate Compounds Made Through Sintering Process," Journal of Power Sources, vol. 174, pp. 832-837 (2007).
Nimisha et al, "Chemical and Microstructural Modifications in LiPON Thin Films Exposed to Atmospheric Humidity," Solid State Ionics, vol. 185, pp. 47-51 (2011).
Office Action issued Jan. 2, 2015 in U.S. Appl. No. 12/198,421 by Johnson.
Office Action issued Jan. 7, 2013 in U.S. Appl. No. 12/198,421 by Johnson.
Office Action issued Jan. 15, 2015 in U.S. Appl. No. 13/829,951 by Johnson.
Office Action issued Jan. 16, 2018 in JP Application No. 2015-535773.
Office Action issued Jan. 17, 2017 in CN Application No. 201380052635.
Office Action issued Jan. 18, 2017 in U.S. Appl. No. 13/829,525, by Johnson.
Office Action issued Jan. 22, 2016 in EP Application No. 13776685.3.
Office Action issued Jan. 24, 2012 in U.S. Appl. No. 12/198,421 by Johnson.
Office Action issued Jan. 25, 2018 in CN Application No. 201380052598.2.
Office Action issued Jan. 31, 2019 in U.S. Appl. No. 15/387,143, by Allie.
Office Action issued Feb. 7, 2018 in U.S. Appl. No. 14/382,194, by Thokchom.
Office Action issued Feb. 10, 2016 in U.S. Appl. No. 13/829,525 by Johnson.
Office Action issued Feb. 15, 2017 in CN Application No. 201380052598.2.
Office Action issued Feb. 20, 2017 in JP Application No. 2014-560097.
Office Action issued Sep. 10, 2021 in CN Application No. 201910697285.1 (with English Translation of Search Report).
Popovici et al, "Sol-gel Preparation and Characterization of Perovskite Lanthanum Lithium Titanate," Journal of Materials Science, vol. 42, pp. 3373-3377 (2007).
Ramzy et al, "Tailor-Made Development of Fast Li Ion Conducting Garnet-Like Solid Electrolytes," Applied Materials & Interfaces, vol. 2, No. 2, pp. 385-390 (2010).
Raskovalov et al, "Structure and transport properties of Li7La3Zr2-0.75xAlxO2 superionic solid electrolytes," Journal of Power Sources (2013).
Rowsell et al, "A new class of materials for lithium-ion batteries: iron(III) borates," Journal of Power Sources, vol. 98-98, pp. 254-257 (2001).

(56) References Cited

OTHER PUBLICATIONS

Sakamoto, "Lithium Batteries," Michigan State University (2011).
Sanchez et al, "Chemical Modification of Alkoxide Precursors," Journal of Non-Crystalline Solids, vol. 100, pp. 65-76 (1988).
Scanlon, "Lithium Polymer Battery, Final Report for Dec. 8, 1994-Dec. 30, 2002," Energy Storage and Thermal Sciences Branch, Air Force Research Laboratory (2003).
Shannon et al., "New Li Solid Electrolytes", Electro, vol. 22, No. 7, pp. 783-796 (Jul. 1977).
Song et al, "Review of Gel-Type Polymer Electrolytes for Lithium-ion Batteries," Journal of Power Sources, vol. 77, pp. 183-197 (1999).
Stramare et al, "Lithium Lanthanum Titanates: A Review," Chemistry of Materials, vol. 15, pp. 3974-3990 (2003).
Sulaiman, "Fabrication and Characterization of $LiN0_3-Al_2O_3$ Composite Solid Electrolytes," 2013 3rd International Conference on Chemistry and Chemical Engineering, vol. 38, pp. 1-5 (2012).
Sun et al, "High-Strength All-Solid Lithium Ion Electrodes Based on $Li_4Ti_5O_{12}$," Journal of Power Sources, vol. 196, pp. 6507-6511 (2011).
Tadnaga et al, "Low temperature synthesis of highly ion conductive $Li_7La_3Zr_2O_{12}$—$Li_3BO_3$ composites," Electrochemistry Communications (Apr. 3, 2013).
Tan et al, "Fabrication and Characterization of $Li_7La_3Zr_2O_{12}$ Thin Films for Lithium Ion Battery," ECS Solid State Letters, vol. 1, No. 6, pp. 057-060 (2012).
Tan et al, "Garnet-type $Li_7La_3Zr_2O_{12}$ Electrolyte Prepared by a Solution-Based Technique for Lithium ion battery," Mater. Res. Soc. Symp. Proc., vol. 1440 (2012).
Tan et al, "Synthesis of Cubic Phase $Li_7La_3Zr_2O_{12}$ Electrolyte for Solid-State Lithium-Ion Batteries," Electrochemical and Solid-State Letters, vol. 15, No. 3, pp. A37-A39 (2012).
Tan, "Materials for energy storage in Lithium-Ion batteries," Dissertation submitted to the University of Utah (Dec. 2012).
Thangadurai et al, "Investigations on Electrical Conductivity and Chemical Compatibility Between Fast Llithium Ion Conducting Garnet-Life $Li_6BaLa_2Ta_2O_{12}$ and Lithium Battery Cathodes," Journal of Power Sources, vol. 142, pp. 339-344 (2005).
Vijayakumar et al, "Synthesis of Fine Powders of $Li_{3x}La_{2/3-x}TiO_3$ Perovskite by a Polymerizable Precursor Method," Chemistry of Materials, vol. 16, No. 14, pp. 2719-2724 (2004).
Wang et al., "Ionic/Electronic Conducting Characteristics of $LiFePO_4$ Cathode Materials," Electrochemical and Solid-State Letters, vol. 10, No. 3, pp. A65-A69 (2007).
West, "Basic Solid State Chemistry," John Wiley & Sons Ltd., Ed. 2, pp. vii-xv, 346-351 (1999).
Wolfenstine, "Grain Boundary Conductivity in Crystalline $LiTi_2(PO_4)_3$," Army Research Laboratory (Apr. 2008).
Written Opinion issued Sep. 22, 2014 in Int'l Application No. PCT/US2013/063161.
Wu et al, "Sol-gel preparation and characterization of $Li_{1.3}Al_{0.3}Ti_{1.7}(PO_4)_3$ sintered with flux of $LiBO_2$," Rare Metals, vol. 29, No. 5, p. 515 (2010).
Xiong et al, "Effects of Annealing Temperature on Structure and Opt-Electric Properties of Ion-Conducting LLTO Thin Films Prepared by RF Magnetron Sputtering," Journal of Alloys and Compounds, vol. 509, pp. 1910-1914 (2011).
Xu, "Nonaqueous Liquid Electrolytes for Lithium-Based Rechargeable Batteries," Chemical Reviews, vol. 104, pp. 4303-4417 (2004).
Yang et al, "Ionic to Mixed Ionic/Electronic Conduction Transition of Chemically Lithiated $Li_{0.33}La_{0.56}TiO_3$ at Room Temperature: Lithium-ion-Motion Dependent Electron Hopping," Applied Physics Letters, vol. 89, pp. 1-3 (2006).
Yu et al, "A Stable Thin-Film Lithium Electrolyte: Lithium Phosphorus Oxynitride," J. Electrochem. Soc., vol. 144, No. 2, pp. 524-532 (1997).
Zallen, "The Physics of Amorphous Solids," Wiley-VCH, Ed. 1, pp. ix-xi (1983).
Zhang et al, "Effect of lithium borate addition on the physical and electrochemical properties of the lithium ion conductor $Li_{3.4}Si_{0.4}P_{0.6}O_4$," Solid State Ionics, vol. 231, pp. 109-115 (2013).
Zhang et al, "Study on Synthesis and Evolution of Sodium Potassium Niobate Ceramic Powders by an Oxalic Acid-Based Sol-Gel Method," Journal of Sol-Gel Science and Technology, vol. 57, pp. 31-35 (2011).
"All-Solid-State Lithium-Ion Battery Using $Li_{2.2}C_{0.8}B_{0.2}O_3$ Electrolyte" External Program 20th Century International Conferencer, Presented on Poster Board, 2 pgs (Jun. 15, 2015).
Aaltonen et al, "Lithium Lanthanum Titanate Thin Films Grown by Atomic Layer Depostion fo rAll-Solid-State Lithium Ion Battery Applications," Abstract #688, The 15th International Meeting on Lithium Batteries (2010).
Ahn et al, "Characteristics of Amorphous Lithium Lanthanum Titanate Electrolyte Thin Films Grown by PLD for Use in Rechargeable Lithium Microbatteries," Electrochemical and Solid-State Letters, vol. 8, No. 2, pp. A75-A78 (2005).
Ahn et al, "Characteristics of Perovskite $(Li_{0.5}La_{0.5})TiO_3$ Solid Electrolyte Thin Films Grown by Pulsed Laser Deposition for Rechargeable Lithium Microbattery," Electrochimica Acta, vol. 50, pp. 371-374 (2004).
Ahn et al, "Effect of $Li_{0.5}La_{0.5}TiO_3$ Solid Electrolyte Films on Electrochemical Properties of $LiCoO_2$ Thin Film Cathodes with Different Rapid-Thermal Annealing Conditions," Journal of Vacuum Science & Technology B, vol. 23, No. 5, pp. 2089-2094 (2005).
Allen et al, "Effect of substitution (Ta, Al, Ga) on the conductivity of $Li_7La_3Zr_2O_{12}$," Journal of Power Sources, vol. 206, pp. 315-319 (2012).
Allnatt et al, "Atomic Transport in Solids," Cambridge University Press, pp. ix-xiii (2003).
Aruna et al, "Combustion Synthesis and Nanomaterials," Current Opinion in Solid State and Materials Science, vol. 12, pp. 44-50 (2008).
Awaka et al, "Synthesis and Structure Analysis of Tetragonal $Li_7La_3Zr_2O_{12}$ with the Garnet-Related Type Structure," Journal of Solid State Chemistry, vol. 182, No. 8, pp. 2046-2052 (2009).
Babic, "A Novel Li Conducting Solid State Electrolyte by Sol Gel Technique" (undated).
Balkanski et al, "Inegrable lithium solid-state microbatteries," Journal of Power Sources, vol. 26, pp. 615-622 (1989).
Bates et al., "Rechargeable Thin-Film Lithium Batteries," Oak Ridge National Laboratory Publication, 9 pgs (1993).
Billinge, "The Nanostructure Problem," Physics, vol. 3, No. 25, pp. 1-3 (2010).
Birke et al, "A first approach to a monolithic all solid state inorganic lithium battery," Solid State Ionics, vol. 118, pp. 149-157 (1999).
Birke et al, "Electrolytic Stability Limit and Rapid Lithium Insertion in the Fast-Ion-Conducting $Li_{0.29}La_{0.57}TiO_3$ Perovskite-Type Compound," Journal of the Electrochemical Society, vol. 144, No. 6, pp. L167-L169 (1997).
Bohnke et al, "Mechanism of Ionic Conduction and Electrochemical Intercalation of Lithium into the Perovskite Lanthanum Lithium Titanate," Solid State Ionics, vol. 91, pp. 21-31 (1996).
Boyd, "Thin Film Growth by Pulsed Laser Deposition," Ceramics International, vol. 22, pp. 429-434 (1996).
Boyle et al, "All-Ceramic Thin Film Battery," Sandia Report 2002-3615 Unlimited Release, 53 pgs (Nov. 2002).
Brenier, "Stress and Moisture-Sorption in Ozone-Annealed Films of Zirconium Oxide Obtained from Sol-Gel," Journal of Sol-Gel Science and Technology, vol. 25, pp. 57-63 (2002).
Brinker et al, "Sol-Gel Science: The Physics and Chemistry of Sol-Gel Processing," Academic Press, pp. 21, 95, 453, 513, 675, 742, 787, and 837 (1990).
Buschmann et al, "Structure and dynamics of the fast lithium ion conductor '$Li_7La_3Zr_2O_{12}$," Physical Chemistry Chemical Physics, vol. 43 (2011).
Cao et al, "Microstructure and Ionic Conductivity of Sb-doped $Li_7La_3Zr_2O_{12}$," Journal of Inorganic Materials, vol. 29, No. 2, pp. 220-224 (2014).
Chabal et al, "Safer High-performance Electrodes, Solid Electrolytes, and Interface Reactions for Lithium-Ion Batteries," Material Matters, vol. 8, No. 4, pp. 104-110 (2013).

(56) References Cited

OTHER PUBLICATIONS

Chen et al, "Improving ionic conductivity of Li0.35La0.55TiO3 ceramics by introducing Li7La3Zr2O12 sol into the precursor powder," Solid State Ionics, vol. 235, pp. 8-13 (2013).

Chen et al., High Capacity and Cyclic Performance in a Three-Dimensional Composite Electrode Filled with Inorganic Solid Electrolyte. Journal of Power Sources, vol. 249, pp. 306-310 (2014).

Chi-Lin Li et al, "Physical and electrochemical characterization of amorphous lithium lanthanum titanate solid electrolyte thin-film fabricated by e-beam evaporation," Thin Solid Films, vol. 515, pp. 1886-1892 (2006).

Cussen, "Structure and Ionic Conductivity in Lithium Garnets," Journal of Materials Chemistry, vol. 20, pp. 5167-5173 (2010).

Davison et al, "Low Cost, Novel Methods for Fabricating All-Solid-State Lithium Ion Batteries," downloaded from web page: <http://www.wpi.edu/Pubs/E-project/Available/E-project-042312-141301/unrestricted/SS_Lithium_Ion_Battery_MQP_Final_Report.pdf>, Download date: Apr. 23, 2012, original posting date unknown, 126 pages.

Drabold, "Topics in the Theory of Amorphous Materials," The European Physical Journal B, vol. 68, pp. 1-21 (2009).

Elliott, "Physics of Amorphous Materials," Longman Scientific & Technical, Ed. 2, pp. v-vi (1990).

Examination Report issued Jun. 22, 2016 in EP Application No. 13776685.3.

Examination Report issued Nov. 30, 2016 in EP Application No. 13776685.3.

Extended European Search Report issued Feb. 8, 2017 in EP Application 16202541.

Extended European Search Report issued Mar. 16, 2017 in EP Application No. 17150717.

Furusawa et al, "Ionic Conductivity of Amorphous Lithium Lanthanum Titanate Thin Film," Solid State Ionics, vol. 176, pp. 553-558 (2005).

Gao et al, "Sol-gel Synthesis and Electrical Properties of Li5La3Ta2O12 Lithium Ionic Conductors," Solid State Ionics, vol. 181, Nos. 1-2, pp. 33-36 (2009).

Geiger et al, "Crystal Chemistry and Stability of 'Li7La3Zr2O12' Garnet: A Fast Lithium-Ion Conductor," Inorganic Chemistry, vol. 50, pp. 1089-1097 (2011).

Glass et al, "Ionic Conductivity of Quenched Alkali Niobate and Tantalate Glasses," Journal of Applied Physics, vol. 49, No. 9, pp. 4808-4811 (1978).

Goodenough et al, "Challenges for Rechargeable Li Batteries," Chemistry of Materials, vol. 22, No. 3, pp. 587-603 (2010).

Huggins, "Advanced Batteries: Materials Science Aspects," Springer, Ed. 1, pp. xvii-xxx, 368-371 (2009).

Hämäläinen et al, "Lithium Phosphate Thin Films Grown by Atomic Layer Deposition," Journal of The Electrochemical Society, vol. 159, No. 3, pp. A259-A263 (2012).

Inaguma et al., "High Ionic Conductivity in Lithium Lanthanum Titanate," Solid State Communications, vol. 86, No. 10, pp. 689-693 (1993).

Int'l Preliminary Examination Report on Patentability issued on Jul. 5, 2018 in Int'l Application No. PCT/US2016/068105.

Int'l Preliminary Report on Patentabililty issued Apr. 23, 2015 in Int'l Application No. PCT/US2013/063160.

Int'l Preliminary Report on Patentability issued Feb. 14, 2013 in Int'l Application No. PCT/US2011/046289.

Int'l Preliminary Report on Patentability issued Sep. 2, 2014 in Int'l Application No. PCT/US2013/028672.

Int'l Preliminary Report on Patentability issued Sep. 12, 2014 in Int'l Application No. PCT/US2013/028633.

Int'l Preliminary Report on Patentability issued Dec. 22, 2014 in Int'l Application No. PCT/US2013/063161.

Int'l Search Report and Written Opinion issued Jan. 6, 2012 in Int'l Application No. PCT/US2011/046289.

Int'l Search Report and Written Opinion issued Mar. 25, 2014 in Int'l Application No. PCT/US2013/063160.

Abraham et al., "A Polymer Electrolyte-Based Rechargeable Lithium/Oxygen Battery," Journal of The Electrochemical Society, vol. 143, No. 1, pp. 1-5 (1996).

Annamareddy et al., "Ion Hopping and Constrained Li Diffusion Pathways in the Superionic State of Antifluorite Li2O," Entropy, vol. 19, No. 227, pp. 1-11 (2017).

Briant et al., "Ionic Conductivity in Lithium and Lithium-Sodium Beta Alumina," Journal of The Electrochemical Society, vol. 128, No. 9, pp. 1830-1834 (1981).

Datta et al., "Silicon and Carbon Based Composite Anodes for Lithium Ion Batteries," Journal of Power Sources, vol. 158, pp. 557-563 (2006).

Extended European Search Report issued Feb. 12, 2020 in EP Application No. 19192837.3.

Giordani et al., "A Molten Salt Lithium-Oxygen Battery," Journal of the American Chemical Society, 26 pages (2016).

International Preliminary Report on Patentability issued Aug. 2, 2018 in International Application No. PCT/US2017/014035.

Int'l Search Report and Written Opinion issued Mar. 16, 2017 in Int'l Application No. PCT/US2017/014035.

Int'l Search Report and Written Opinion issued Aug. 25, 2020 in Int'l Application No. PCT/US2020/026334.

Kim et al., "A review of lithium and non-lithium based solid state batteries," Journal of Power Sources, vol. 282, pp. 299-322 (2015).

Kotobuki et al., "Fabrication of All-Solid-State Lithium Battery with Lithium Metal Anode Using Al2O3-Added Li7 La3 Zr2 O12 Solid Electrolyte," Journal of Power Sources, vol. 196, pp. 7750-7754 (2011).

Li et al., "Developments of electrolyte systems for lithium-sulfur batteries: a review," Frontiers in Energy Research, vol. 3, No. 5, pp. 1-12 (2015).

Limthongkul et al., "Electrochemically-Driven Solid State Amorphization in Lithium-Silicon Alloys and Implications for Lithium Storage," Acta Materialia, vol. 51, pp. 1103-1113 (2003).

Ma, Ying, "Ceria-based Nanostructured Materials for Low-Temperature Solid Oxide Fuel Cells," School of Information and Communication Technology, Functional Materials Division, Royal Institute of Technology, 52 pages (2012).

Masset et al., "Thermal activated (thermal) battery technology Part II. Molten salt electrolytes," Journal of Power Sources, vol. 164, pp. 397-414 (2007).

Miles et al., "Cation Effects on the Electrode Reduction of Molten Nitrates," Journal of The Electrochemical Society, vol. 127, pp. 1761-1765 (1980).

Miles, Melvin H., "Lithium Batteries Using Molten Nitrate Electrolytes," Battery Conference on Applications and Advances. The Fourteenth Annual, pp. 39-42 (1999).

Obrovac et al., "Reversible Cycling of Crystalline Silicon Powder," Journal of The Electrochemical Society, vol. 154, No. 2, pp. A103-A108 (2007).

Office Action and Search Report issued Jan. 20, 2021 in TW Application No. 109111527 (with Brief Summary of Relevant Portions of Office Action).

Office Action issued Jan. 12, 2022 in U.S. Appl. No. 16/592,562, by Allie.

Office Action issued Jun. 7, 2018 in U.S. Appl. No. 15/408,991, by Johnson.

Office Action issued Jun. 10, 2019 in JP Application No. 2018538203 (Partial English Translation).

Office Action issued Nov. 2, 2018 in U.S. Appl. No. 12/198,421, by Johnson.

Office Action issued Dec. 17, 2020 in CN Application No. 201780007783.8.

Read et al., "Characterization of the Lithium/Oxygen Organic Electrolyte Battery," Journal of The Electrochemical Society, vol. 149, No. 9, pp. A1190-A1195 (2002).

Singhal et al., "High Temperature Solid Oxide Fuel Cells: Fundamentals, Design and Applications," Elsevier Advanced Technology, 430 pages (2003).

Wang et al., "Ionic Conductivities and Structure of Lithium Phosporus Oxynitride Glasses," Journal of Non-Crystalline Solids, vol. 183, pp. 297-306 (1995).

(56) References Cited

OTHER PUBLICATIONS

Extended European Search Report issued Dec. 16, 2021 in EP Application No. 21186896.3.
Office Action issued Feb. 9, 2022 in EP Application No. 16823507.5.
Office Action issued Aug. 30, 2021 in JP Application No. 2020114023.
Office Action issued Feb. 21, 2020 in KR Application No. 1020187020835.
Office Action issued Mar. 2, 2016 in CN Application No. 201380023413.5.
Office Action issued Mar. 14, 2018 in U.S. Appl. No. 13/829,525, by Johnson.
Office Action issued Mar. 17, 2020 in U.S. Appl. No. 16/109,295, by Johnson.
Office Action issued Mar. 30, 2018 in CN Application No. 201380023413.5.
Office Action issued Apr. 9, 2015 in U.S. Appl. No. 13/829,525 by Johnson.
Office Action issued Apr. 10, 2018 EP Application No. 16202541.5.
Office Action issued Apr. 29, 2014 in U.S. Appl. No. 12/848,991 by Babic.
Office Action issued May 1, 2014 in U.S. Appl. No. 13/410,895, by Babic.
Office Action issued May 4, 2015 in U.S. Appl. No. 13/829,951 by Johnson.
Office Action issued May 4, 2016 in KR Application No. 10-2014-7027734.
Office Action issued May 19, 2017 in U.S. Appl. No. 12/198,421, by Johnson.
Office Action issued May 30, 2017 in JP Application No. 2015-535772.
Office Action issued Jun. 2, 2016 in CN Application No. 201380052598.2.
Office Action issued Jun. 5, 2019 in CN Application No. 201380052598.2.
Office Action issued Jun. 12, 2017 in U.S. Appl. No. 14/382,194, by Thokchom.
Office Action issued Jun. 13, 2017 in JP Application No. 2015-535773.
Office Action issued Jun. 15, 2017 in U.S. Appl. No. 14/382,191, by Thokchom.
Office Action issued Jun. 17, 2019 in U.S. Appl. No. 15/387,143, by Allie.
Office Action issued Jun. 19, 2014 in U.S. Appl. No. 13/829,951, by Johnson.
Office Action issued Jun. 24, 2019 in JP Application No. 2018551909.
Office Action issued Jun. 26, 2015 in U.S. Appl. No. 14/530,171 by Babic.
Office Action issued Jul. 1, 2015 in U.S. Appl. No. 13/829,525 by Johnson.
Office Action issued Jul. 5, 2016 in CN Application No. 201380052635.X.
Office Action issued Jul. 13, 2011 in U.S. Appl. No. 12/163,044 by Johnson.
Office Action issued Jul. 15, 2016 in KR Application No. 10-2014-7027734.
Office Action issued Jul. 20, 2017 in CN Application No. 201380052635.X.
Office Action issued Jul. 21, 2016 in U.S. Appl. No. 13/829,951, by Johnson.
Office Action issued Jul. 27, 2016 in U.S. Appl. No. 13/829,525, by Johnson.
Office Action issued Aug. 7, 2017 in U.S. Appl. No. 13/829,525, by Johnson.
Office Action issued Aug. 7, 2019 in U.S. Appl. No. 12/198,421, by Johnson.
Office Action issued Aug. 11, 2017 in CN Application No. 201380023413.5.
Office Action issued Aug. 22, 2016 in JP Application No. 2014-560097.
Office Action issued Aug. 31, 2015 in KR Application No. 10-2014-7027734.
Office Action issued Sep. 3, 2018 in CN Application No. 201380052598.2.
Office Action issued Sep. 4, 2015 in EP Application No. 13776685.3.
Office Action issued Sep. 7, 2015 in JP Application No. 2014-560097, translation only.
Office Action issued Sep. 8, 2015 in U.S. Appl. No. 12/198,421 by Johnson.
Office Action issued Sep. 14, 2016 in U.S. Appl. No. 12/198,421, by Johnson.
Office Action issued Nov. 18, 2016 in CN Application No. 201380023413.5.
Office Action issued Nov. 18, 2016 in U.S. Appl. No. 13/829,951, by Johnson.
Office Action issued Dec. 6, 2013 in U.S. Appl. No. 12/848,991 by Babic.
Office Action issued Dec. 13, 2018 in CN Application No. 2013800234135.
Office Action issued Jun. 29, 2018 in U.S. Appl. No. 14/382,194, by Thokchom.
Oh et al, "Ionomer Binders Can Improve Discharge Rate Capability in Lithium-Ion Battery Cathodes," Journal of The Electrochemical Society, vol. 158, No. 2, pp. A207-A213 (2011).
Ohta et al, "All-solid-state lithium ion battery using garnet-type oxide and Li3BO3 solid electrolytes fabricated by screen-printing," Journal of Power Sources (2013).
Okumura et al., "All-Solid-State Lithium-Ion Battery Using Li2.2C0.8B0.8B0.2O3 Electrolyte", Solid State Ionic, vol. 288, pp. 248-252 (2016).
Owen, "Rechargeable Lithium Batteries," Chemical Society Reviews, vol. 26, pp. 259-267 (1997).
Peters et al, "Ionic Conductivity and Activation Energy for Oxygen Ion Transport in Superlattices—The Multilayer System CSZ (ZrO2+CaO) / Al2O3," Solid State Ionics, vol. 178, Nos. 1-2, pp. 67-76 (2007).
Pham et al, "Synthesis and Characterization of Nanostructured Fast Ionic Conductor Li0.30La0.56TiO3," Chemistry of Materials, vol. 18, No. 18, pp. 4385-4392 (2006).
International Search Report issued May 3, 2022 in International Application No. PCT/US2022/011012.
Office Action issued May 16, 2022 in U.S. Appl. No. 16/838,706, by Johnson.
Office Action issued Feb. 13, 2023 in U.S. Appl. No. 17/667,130, by Johnson.
Office Action issued Dec. 23, 2022 in JP Application No. 2021-558652.
International Preliminary Report on Patentability and Written Opinion issued Apr. 27, 2023 in PCT Application No. PCT/US2021/054529.
Office Action issued May 23, 2023 in KR Application No. 10-2021-7032668.
Office Action issued Aug. 23, 2023 in U.S. Appl. No. 17/499,236, by Johnson.
Office Action issued Mar. 14, 2024 in CN Application No. 202210195421.9.
Office Action issued Apr. 17, 2024 in CN Application No. 202080024763.3.
Tatsumisago et al., "Preparation of Li3BO3-Li2SO4 glass-ceramic electrolytes for all-oxide lithium batteries," Journal of Power Sources, vol. 270, pp. 603-607 (2014).
Office Action issued Jul. 3, 2024 in U.S. Appl. No. 17/567,631, by Johnson.
Office Action issued Feb. 16, 2024 in U.S. Appl. No. 17/499,236 by Johnson.
Ting et al., "Review of micromachining of ceramics by etching," Transections of Nonferrous Metals Society of China, vol. 19, pp. S1-S16 (2009).

(56) References Cited

OTHER PUBLICATIONS

Vu et al., "Porous Electrode Materials for Lithium-Ion Batteries—How to Prepare Them and What Makes Them Special," Advanced Energy Materials, vol. 2, pp. 1056-1085 (2012).

* cited by examiner

SOLID-STATE BATTERY SEPARATOR INCLUDING LOW MELT TEMPERATURE INORGANIC ELECTROLYTE AND METHOD OF FABRICATING THE SAME

RELATED APPLICATIONS

This application is a divisional of co-pending U.S. patent application Ser. No. 16/109,295, which was filed on Aug. 22, 2018, which is a continuation of U.S. patent application Ser. No. 13/829,525, which was filed on Mar. 14, 2013, now U.S. Pat. No. 10,084,168, which claims priority to U.S. Provisional Application No. 61/711,676, which was filed on Oct. 9, 2012, the disclosures of which are incorporated herein by reference in their entireties.

BACKGROUND

Solid-state Lithium batteries were developed by Duracell in the 1970's and made commercially available in the 1980's but are no longer produced. The cells used a lithium metal anode, a dispersed phase electrolyte of lithium iodide and $Al_2O_3$ and a metal salt as the cathode. The $Li/LiI(Al_2O_3)$/metal salt construction was a true solid-state battery. These batteries were not rechargeable.

It has long been a goal to develop a rechargeable solid state lithium-based battery using inorganic solid electrolyte material because of the passivation reactions and unstable interfaces that form between organic electrolyte materials such as liquid and solid polymer electrolytes. In the early 1990's another all-solid-state battery was developed at the Oak Ridge National Laboratories. These cells consist of thin films of cathode, inorganic electrolyte, and anode materials deposited on a ceramic substrate using vacuum deposition techniques including RF sputtering for the cathode and electrolyte, and vacuum evaporation of the Li metal anode. The total thickness of the cell is typically less than 10 um with the cathode being less than 4 um, the solid electrolyte around 2 um (just sufficient to provide electrical isolation of the cathode and anode) and the Li anode also around 2 um. Since strong chemical bonding (both within each layer and between the layers of the cell) is provided by the physical vapor deposition technique, the transport properties are excellent. Although the solid electrolyte LiPON has a conductivity of only $2 \times 10^{-6}$ S/cm-1 (fifty times lower than that of the $LiI(Al_2O_3)$ solid electrolyte used in the Duracell battery described above), the impedance of the thin 2 um layer is very small allowing for very high rate capability. Batteries based on this technology are very expensive to fabricate, are very small, and have very low capacity.

Currently, Li-ion battery chemistry gives the highest performance and is becoming the most widely used of all battery chemistries. The cells consist of thick (~100 um) porous composite cathodes cast on a thin (~10 um) Al foil current collector. The composite cathode typically contains $LiCoO_2$ as the active material due to its high capacity and good cycle life, and carbon black to provide electrical conductivity throughout the layer. A thin polymer separator is used to provide electrical isolation between the cathode and the carbon based anode which intercalates Li during the charge cycle. The cell is immersed in liquid electrolyte which provides very high conductivity for the transport of Li ions between the cathode and anode during charge and discharge. Because the thick composite cathode is porous, the liquid electrolyte is absorbed into and fills the structure, and thus provides excellent surface contact with the $LiCoO_2$ active material to allow fast transport of Li ions throughout the cell with minimal impedance.

The liquid electrolyte itself consists of a Li salt (for example, $LiPF_6$) in a solvent blend including ethylene carbonate and other linear carbonates such as dimethyl carbonate. Despite improvements in energy density and cycle life, there remains an underlying problem with batteries that contain liquid electrolytes. Liquid electrolytes are generally volatile and subject to pressure build up explosion and fire under a high charge rate, a high discharge rate, and/or internal short circuit conditions. Charging at a high rate can cause dendritic lithium growth on the surface of the anode. The resulting dendrites can extend through the separator and cause a short circuit in the cell. The self-discharge and efficiency of the cell is limited by side reactions and corrosion of the cathode by the liquid electrolyte. The liquid electrolyte also creates a hazard if the cell over-heats due to overvoltage or short circuit conditions creating another potential fire or explosion hazard.

To address safety and reliability problems with lithium based batteries that employ liquid electrolytes, and to achieve high energy density, solid-state batteries that employ high capacity lithium intercalation compounds are being developed. These all-solid-state batteries consist of a composite cathode containing active battery cathode material (e.g., $LiNiMnCoO_2$, $LiCoO_2$, $LiMn_2O_4$ $Li_4Ti_5O_{12}$ or similar), an electrically conductive material (e.g., carbon black), and lithium ion conductive glass electrolyte material, such as $Li_{3x}La_{2/3-x}TiO_3$ (x=0.11) (LLTO) or $Li_7La_3Zr_2O_{12}$ (LLZO) that is formed in situ from a liquid precursor via a low temperature sol gel process. When gelled and subsequently cured, the precursor is transformed into a solid lithium ion conductive glass electrolyte. Past attempts at constructing such all-solid-state batteries have been limited by the need to bind the materials together in order to facilitate effective lithium ion transport across interfaces. This binding process has been attempted by sintering at high temperature. The temperatures required for effective sintering are in the range of 600° C. and higher. The problem has been that the cathode and electrolyte materials will react with each other at such sintering temperatures resulting in high impedance interfaces and an ineffective battery.

In constructing a solid-state battery using the low temperature sol gel approach, a cathode is formed by mixing a lithium active material, an electrically conductive material, and the liquid sol gel precursor to form a slurry or paste. The cathode can be formed as either a thick pellet or as a thin casting containing the mixture of cathode components. The cathode is held together by the ion conductive glass electrolyte matrix that is formed by gelling and curing the sol-gel precursor solution. Curing temperature for the gelled precursor is in the range of 300° C., thus parasitic reactions are avoided.

Construction of battery electrodes using the sol gel approach to produce glass electrolyte as a binder requires proper gelling, drying, and curing of the precursor. Gelling of precursors for LLTO and LLZO is a hygroscopic process. Moisture must diffuse into the cathode structure through the tortuous path formed by the densely packed cathode powder materials in order for the cathode material to gel properly throughout. Secondly, drying of the precursor after gelling can be time consuming because solvents and alcohols must diffuse through the gelled electrolyte within the tortuous compacted electrode powder structure.

The all-solid-state primary cell developed by Duracell and described in detail above demonstrated very high energy densities of up to 1000 Wh/L and excellent performance in terms of safety, stability, and low self-discharge. However, due to the pressed powder construction and the requirement for a thick electrolyte separation layer, the cell impedance was very high, severely limiting the discharge rate of the battery. This type of cell is also restricted in application because the electrochemical window is limited to less than three volts due to the iodide ions in the electrolyte which are oxidized above approximately three volts. In addition, a stable rechargeable version of this cell was never developed.

The all-solid-state thin film battery developed by Oak Ridge National Laboratories, also detailed above, addresses many of the problems associated with Li-ion technology, but also has limitations of its own. The vacuum deposition equipment required to fabricate the cells is very expensive and the deposition rates are slow leading to very high manufacturing costs. Also, in order to take advantage of the high energy density and power density afforded by use of the thin films, it is necessary to deposit the films on a substrate that is much smaller and lighter than the battery layers themselves so that the battery layers make up a significant portion of the volume and weight of the battery compared to the inert substrate and packaging components. It is not practical to simply deposit thicker layers as the cathode thickness is limited because lithium diffusion rates within the active material limit the thickness of a cathode that can be charged and discharged at useful rates. Therefore the films must be deposited on very thin substrates (<10 um) or multiple batteries must be built up on a single substrate, which leads to problems with maintaining low interface impedance with the electrolyte during the required high temperature annealing of the cathode material after deposition.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Implementations of separators for rechargeable solid-state batteries are described. In at least some embodiments, separators are fabricated from high ionic, conductive filler powder and meltable inorganic solid electrolyte. The meltable inorganic solid electrolyte is configured to bond together the high ionic, conductive filler powder to form the separator.

Implementations for methods of fabricating rechargeable solid-state batteries are described. In at least some embodiments, batteries are fabricated from a cathode current collector foil substrate by roll casting a cathode slurry on the cathode current collector foil substrate.

Implementations for methods of fabricating rechargeable solid-state batteries are described. In other embodiments, batteries are fabricated by coextruding cathode material and separator material and laminating a cathode current collector foil to the cathode material by hot press rolling.

BRIEF DESCRIPTION OF THE DRAWINGS

Embodiments of Solid-State Battery Separators and Methods of Fabrication are described with reference to the following Figures. The same numbers may be used throughout to reference like features and components that are shown in the Figures.

DETAILED DESCRIPTION

Figure 1:
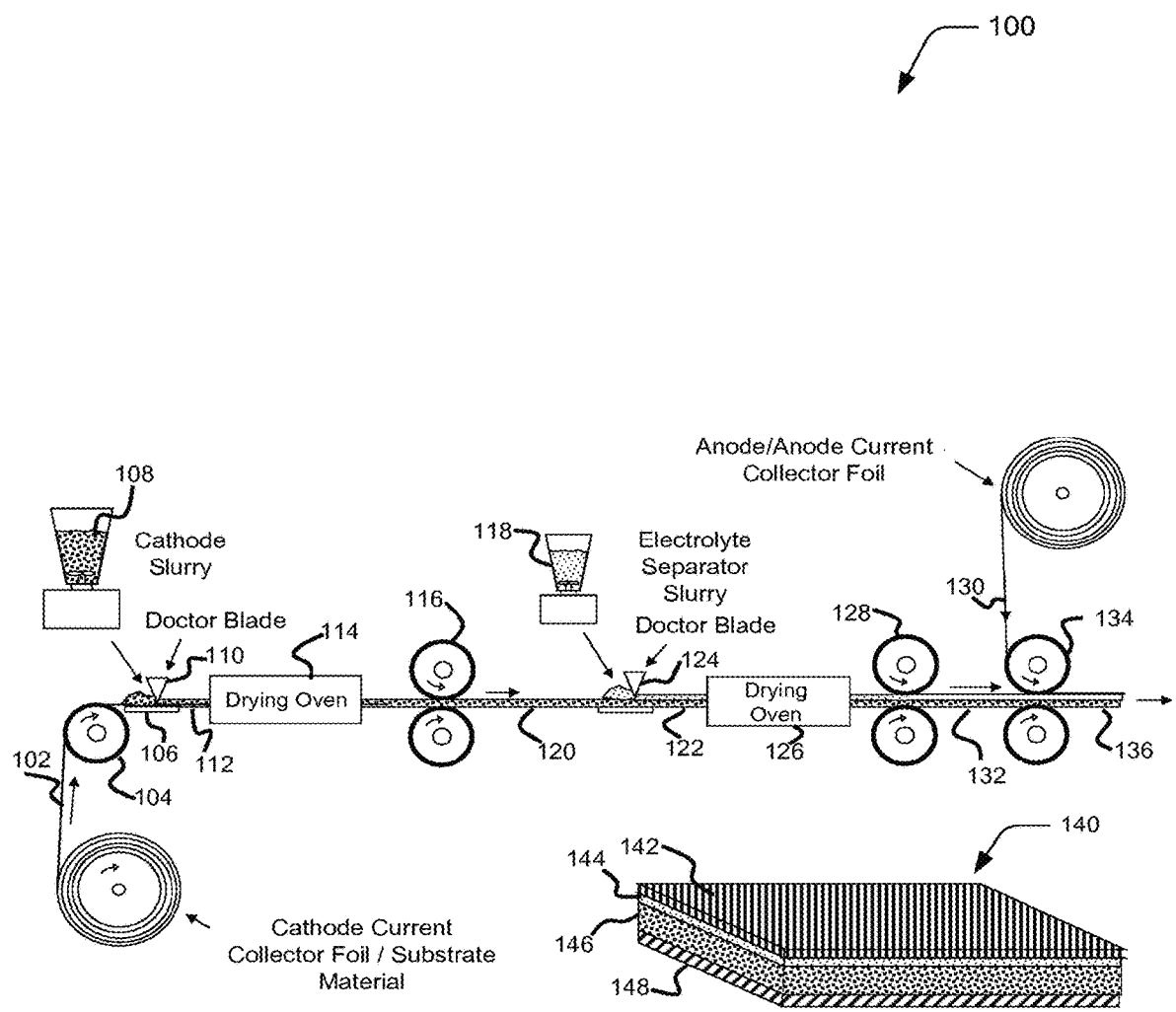
FIG. 1 illustrates an example process for constructing a solid-state battery having a final cell structure representative of a low-melt temperature electrolyte bonded solid-state rechargeable battery electrode.

Implementations of solid-state batteries relate to the construction of various all-solid-state batteries, to include: one or more embodiments of a low melt temperature electrolyte bonded solid-state rechargeable battery electrode; one or more embodiments of a composite separator having a low melt temperature electrolyte component; one or more embodiments of solid-state battery electrodes, separator co-extrusion and roll casting; and/or one or more embodiments of composite low melt temperature electrolyte coated lithium and lithium alloy anodes. Solid-state batteries are the focus of a great deal of attention because of the potential for attractive performance properties including: (1) long shelf life, (2) long term stable power capability, (3) no gassing, (4) broad operating temperature range: 40° C. to 170° C. for pure lithium anodes and up to and beyond 300° C. using active composite anodes, and (5) high volumetric energy density, up to 2000 Wh/L. They are particularly suited for applications requiring long life under low-drain or open-circuit conditions.

In embodiments, a solid-state battery with improved manufacturability over existing solid-state batteries, as well as improved performance and safety over existing Li-ion technology can be constructed using simple manufacturing techniques, such as doctor blade casting and hot rolling. Also, other simple and fast techniques, such as low temperature compression using processes that include hot pressing or rolling, can be utilized in the fabrication of a solid-state battery. Further, a solid-state battery can be fabricated at low cost using ceramic processing techniques such as casting and hot roll annealing. An all-solid-state cell can be constructed that has low impedance, utilizes thick active electrodes relative to the thickness of the inert components, can be fabricated on a large scale, and is safe for applications such as powering cell phones, computers, any other type of electronic device, and even electric vehicles. The solid-state rechargeable batteries have long term stability and reliability, and are suitable for use as a permanent component in such devices.

In embodiments, a solid-state battery has constituent components that are bonded together by an inorganic glass electrolyte produced in situ by a low melt temperature reaction that bonds the constituent materials together to enable ion conduction continuity. The low temperature bonding or sintering of constituent materials of the battery avoids the problems associated with high temperature sintering such as atomic diffusion and migration that can lead to high interface impedances between lithium active materials and lithium electrolyte materials. It is desirable in one or more implementations to have sintering occur below 600° C. A battery electrode can be constructed with powders of a lithium active material, such as lithium titanium oxide, lithium cobalt oxide, lithium manganese oxide, or other lithium-based electrochemically active battery material. A solid-state electrolyte can be utilized, such as lanthanum lithium titanium oxide ($Li_{3x}La_{2/3-x}TiO_3$ (x=0.11)), lanthanum lithium zirconium oxide (Garnet ($Li_7La_3Zr_2O_{12}$)), Sulphide ($Li_{10}GeP_2S_{12}$), Ohara Corp (LiSICON), or similar solid-state electrolyte with high lithium ion conductivity, and an additive such as carbon black carbon nanotubes or other suitable material to provide electrical conductivity all bonded together by an inorganic electrolyte such as Lithium Phosphorous Oxynitride (LiPON).

The active material selected for inclusion in a given electrode can be chosen for a desired operating voltage and capacity, and whether its intended function is as a cathode or anode in the final cell. In embodiments, a separator can include powder material of a solid-state electrolyte, such as lanthanum lithium zirconium oxide or similar solid-state electrolyte with high lithium ion conductivity bonded together by an electrolyte formed in situ such as Lithium Phosphorous Oxynitride (LiPON) produced by melt and reaction at low temperature reaction.

The powder constituents of an electrode or separator are first thoroughly mixed. The mixture can be hot pressed as a pellet or it can be spun, spray, doctor blade casted or printed onto a substrate to produce cathode, electrolyte separator, and anode component layers of a cell that are 3 um to 1 mm thick. The formed cell components are subsequently hot pressed or rolled at an elevated temperature sufficient to soften or melt the low melt temperature electrolyte constituent of the electrode. Upon cooling and re-hardening, the low melt constituent binds the electrode together and provides ionic conductive continuity between the component powder particles. The high ion conductive powder electrolyte component dispersed within the electrode provides low impedance for conduction of lithium ions throughout the structure of the electrode to enable a resulting cell that has high charge and discharge rate capability. The electrically conductive component dispersed in the cathode provides low impedance for transport of electrons throughout the cathode construction to allow for high rate capability.

The electrode can be constructed (to include manufactured, fabricated, etc.) to stand alone as in a pressed pellet, or can be fabricated as a thin coating applied to a substrate. If the standalone construction is used, a current collector (aluminum, nickel, copper, or similar metal) can be sputtered or evaporated onto the electrode as a coating to act as a current collector and to provide electrical contact. The current collector could also be bonded as a foil onto one surface of the electrode during the high temperature pressing process. Alternatively, if the electrode is coated onto a non-electrically conductive substrate, then the substrate will be coated first with a suitable current collector to provide electrical contact to the cathode. The substrate material can be a metal foil, ceramic, polymer, and/or any other suitable material.

A composite battery electrode is formed using low melt temperature electrolyte as a binder to achieve low interface impedance bonding between the constituents. A surface of the composite electrode formed in this manner can be coated with a thin layer of the same low melt temperature electrolyte used inside the composite cathode to function as an electrolyte separator between the cathode and anode. The coating may include a filler powder of the high ionic conductive material thus forming a composite separator. A thin coating of lithium metal is evaporated onto the electrolyte separator coating to form an anode and thereby complete the battery.

In an alternate design to make a Li-ion cell, a first electrode is formed as an anode containing a Li ion intercalation compound having a low lithium reaction potential. A second electrode is formed as a cathode containing a Li ion intercalation material that has a higher reaction potential than the material used in the first electrode. The anode and cathode thus formed are bonded to each other using a low melt temperature electrolyte separator layer to form an all-solid-state battery having a solid-state glass electrolyte bonded cathode and solid-state glass electrolyte bonded anode.

Metal oxide electrolytes having conductivities in the range of $10^{-3}$ S/cm have been fabricated. Yet, use of such materials as solid electrolytes in all-solid-state batteries has been limited. One problem is the high interface impedance that results from the high temperature sintering process used to form the bonds between the electrolyte and active cathode materials. Bonding is needed to enable lithium ion conduction between the materials; however, inter-atomic migration during sintering results in very high interface impedance and very limited functionality of a resulting cell.

On the other hand, Lithium Phosphorous OxyNitride (LiPON) is a solid electrolyte that has relatively low ionic conductivity, in the range of $10^{-6}$ S/cm. This material is typically produced as a thin film coating by reactive sputter deposition. However, similar ion conductive material can be fabricated in bulk by solid-state reaction, although material produced to date has not been the exact composition and have shown lower ionic conductivity. LiPON is a glass electrolyte that softens at temperatures in the range of 300° C. Reactive sputtered compositions have been fabricated that display conductivity as high as $9.4 \times 10^{-6}$ S/cm. In constructing thin film batteries, LiPON is sputter deposited as a thin, 1 um to 2 um coating on top of a cathode layer followed by a evaporated coating of anode material, typically lithium. Even though the actual conductivity of LiPON is only in the 1 $e^{-6}$ S/cm range, its use in thin film form allows relatively low levels of cell resistance to be achieved. The "high" conductivity form of LiPON generally has the formulation $Li_3PN_{0.14}O_4$. However as a glass, a range of mixture ratios of the constituent elements is possible and its conductivity varies with composition. It has long been a desire to develop a method for producing LiPON in bulk that has ionic conductivity that is comparable to that produced by reactive sputter deposition. Another example of low melt temperature, ion conductive material is the amorphous mixture of $LiNO_3$ and nano-$Al_2O_3$. The ionic conductivity of $LiNO_3$ and $Al_2O_3$ mixture is in the range of $10^{-6}$ S/cm, similar to LiPON. $LiNO_3$ and $LiNO_2$ are lithium nitrates salts having melt temperatures of 255° C. and 220° C. respectively. $LiH_2PO_4$ and $P_2O_5$ are solid acids having melt temperatures of 189° C. and 340° C. respectively. Generally a balanced reaction between one of these salts and one of the acids produces lithium phosphate ($LiPO_3$ and/or $Li_3PO_4$) as reaction products. However, including a small percentage of excess salt as a reactant results in a reaction product mixture that includes nitrogen salt dispersed in the lithium phosphate reaction product. An unanticipated result is that the dispersed lithium nitride salt results in formation of a LiPON mixture that displays ionic conductivity at a level similar to that of LiPON produced by reactive sputter deposition. The resulting reaction product is not meltable at low temperature. Alternatively, other electrolytes that exhibit usable conductivity and melt temperature characteristics include $Li_2O$—$MoO_3$, $Li_2O$—$WO_3$, $LiBr$—$Li_2O$—$WO_3$, and $LiBr$—$Li_2O$—$B_2O_3$—$P_2O_5$.

Although these example low melt temperature electrolytes have low ionic conductivities, their low melt temperature makes them suitable for effectively bonding with and forming low ionic impedance interfaces with lithium active battery materials and with other, faster lithium ion conductive materials. They can be heated to a molten or near molten state and interfaced with lithium active materials without the inter-atomic migration problems typically associated with high temperature sintering, a problem which until now has limited the practical construction of high performance all-solid-state batteries. The low conductivity, low melt temperature electrolyte is, in effect, employed in thin film form in order to achieve high conductivity rates, similar to the way low conductivity electrolyte is used in thin film batteries.

The low melt temperature, low conductivity electrolyte can be used to form thin film links or interfaces between the constituent powder components of the electrode. A lithium active powder such as Lithium Nickel Manganese Cobalt Oxide, an electrically conductive powder such as carbon black or powder like carbon nanotubes, and a fast ionic conductive solid electrolyte powder such as Lithium Lanthanum Zirconium Oxide (LLZO) having ionic conductivity in the $10^{-3}$ S/cm range can all be combined with a salt and acid mixture of $LiNO_2$ or $LiNO_3$ and $LiH_2PO_4$ or $P_2O_5$. Heating the mixture under pressure at relatively low temperature causes the salt to melt and react with the acid to produce a lithium ion conductive glass matrix that bonds the structure together. The fast LLZO component provides high conductivity rates across the entire depth of the cathode once the constituent powders are all linked to each other via the low interface impedances enabled by the in situ formed electrolyte component.

To construct an electrode (cathode or anode), the powder components, including the low melt temperature electrolyte in powder form are all mixed together and then hot pressed into a pellet or casting. The combination of heat and pressure causes the low melt temperature electrolyte to soften and flow into the voids between the other component powder particles. The low melt temperature electrolyte bonds the other component particles together and provides ionic conductivity between them. The fast ion conductive electrolyte component functions as the primary lithium ion conductive material for conducting ions across the thickness of the electrode. The low melt temperature electrolyte primarily forms thin interface layers between the component particles to minimize the overall ionic impedance of the electrode. The different functional roles of the two electrolytes enable the construction (to include manufacture, fabrication, etc.) of relatively thick, low impedance electrodes.

In an alternate embodiment, the low temperature electrolyte is used to form a protective coating on the individual lithium active powder particles. The approach is to mill the lithium active, electrically conductive carbon nanotubes and the low melt temperature electrolyte powders together as a dry mixture in a mill having sufficient energy such that the particle to particle friction generates sufficient heat to melt the low melt temperature electrolyte component. The individual lithium active particles become individually coated with a film of ion conductive glass which also conducts electrons because of the carbon embedded therein. The coated particles can be subsequently mixed, at low energy so as not to disturb the coating, with Lithium Phosphorous Sulfide based super ionic conductive electrolyte material, such as $Li_{10}GeP_2S_{12}$ which, without the glass electrolyte coating, could form an unstable interface with the lithium active material. Yet another embodiment is to apply a thin electrolyte separator coating of the low melt temperature electrolyte, or a mixture of the low melt temperature electrolyte, and a fast lithium ion conductive electrolyte onto the surface of a lithium active electrode (anode or cathode). The coating may be applied by hot pressing or hot roll coating/extrusion.

FIG. 1 illustrates an example 100 of constructing an all-solid-state lithium battery cell representative of slurry coated construction with a lithium metal anode in one or more embodiments of solid state batteries. Cathode current collector foil 102 is used as a substrate and as a cathode current collector for the battery. The foil passes over roller 104 and onto casting table 106. Slurry 108 is premixed by milling and is supplied to the casting table. The slurry includes of a carrier liquid with an active cathode powder, a low melt temperature electrolyte powder, a fast ion conductive electrolyte powder, and an electrically conductive powder. A liquid such as acetonitrile is selected as the liquid component of the slurry based on its chemical stability with the constituent powders in the slurry and it having sufficient vapor pressure for easy removal by evaporation. The slurry 108 is coated onto the foil substrate 102 as the substrate passes across the casting table 106. Doctor blade 110 is used to control the thickness of the resulting coating.

The coated foil 112 passes through dryer oven 114 where the carrier liquid is removed by evaporation and the casting is preheated prior to passing on to hot rollers 116. The coated foil 112 passes through hot rollers 116. The temperature of rollers 116 would typically be less than about 500° C. The temperature of rollers 116 is sufficient to melt or soften the low melt temperature electrolyte causing it to flow under the pressure of the rollers into the pores and gaps between the constituent powder particles as the particles are pressed closer to each other under the force applied by the rollers.

Next, an electrolyte separator slurry 118 is coated on top of the cathode casting 120, where the electrolyte separator slurry 118 is electrolyte powder and a liquid carrier, such as acetonitrile. Slurry 118 may optionally contain fast conductive electrolyte powder as well as the low melt temperature component. Doctor blade 124 is used to control the thickness of the casting. The now multilayer casting 122 passes through dryer oven 126 where the carrier liquid is removed from the coating. Hot rollers 128 apply heat and pressure to melt or soften the electrolyte powder coated on the surface of the cathode, as well as melt, at least to some extent, the low melt temperature electrolyte within the cathode yielding monolithic glass electrolyte bonded and coated cathode casting 132 on the current collector foil. Finally, anode foil 130 is hot pressed and bonded to the surface of the glass electrolyte coating by hot rollers 134 to form the completed cell casting 136. Foil 130 may be lithium foil, copper foil, lithium coated copper foil, or other suitable anode or anode current collector material. Alternatively, the anode may be applied by evaporation under vacuum. If lithium is not employed, then the lithium anode will be first formed upon the initial charge of the cell as lithium is plated beneath the anode current collector. Solid-state battery cell 140 is representative of the structure of an all-solid-state lithium battery cell with a cathode current collector/substrate 148, composite cathode 146, glass electrolyte coating 144, and anode/anode current collector 142.

Figure 2:
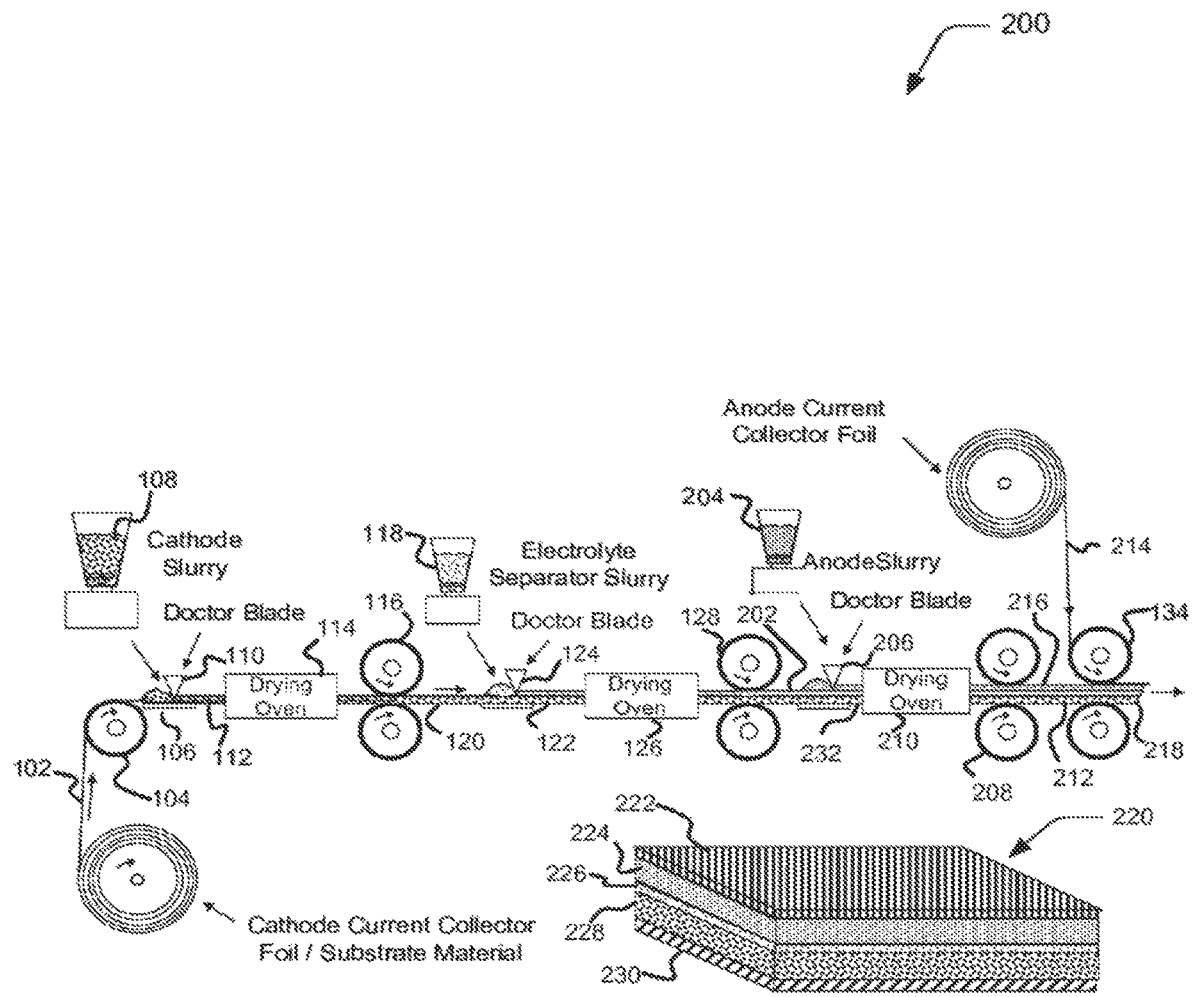
FIG. 2 illustrates an example construction of an all-solid-state lithium ion battery cell with an active anode in one or more embodiments of a solid-state battery.

FIG. 2 illustrates an example 200 of constructing of an all-solid-state lithium ion battery cell representative of slurry coated construction with an anode current collector foil in one or more embodiments of solid state batteries. An active anode is employed instead of a lithium metal anode. Similar to the construction of the lithium metal anode cell, cathode current collector foil 102 is used as a substrate and as a cathode current collector for the battery. The foil 102 passes over roller 104 and onto casting table 106. Active cathode powder, a low melt temperature electrolyte powder, a fast ion conductive electrolyte powder, an electrically conductive powder, and carrier liquid slurry 108 is coated onto the substrate using doctor blade 110. The slurry is dried by oven 114 and calendared using hot rollers 116 to bond the structure together.

Next, a slurry of electrolyte separator powder 118 is coated on top of the cathode casting 120 using doctor blade 124, where the electrolyte separator powder slurry 118 is electrolyte reactant powder and a carrier liquid, such as acetonitrile. Slurry 118 may optionally contain a fast conductive electrolyte powder as well as the low melt temperature component. The resulting casting 122 is dried in oven 126. Hot rollers 128 apply heat and pressure to reflow the low melt temperature electrolyte material in the cathode and separator to bond the structure together. Next, slurry of active anode material 204 is coated on top of thus formed separator coating 202 using doctor blade 206. The multilayer casting 232 passes through oven 210 for drying and optional preheating, and subsequently through hot rollers 208 for electrolyte reflow and calendaring to bond the structure together. Finally, anode current collector foil 214 is hot pressed and bonded to the surface of the thus formed active anode layer 216 of cell casting 212 by hot rollers 134 to form the completed cell casting 218. Alternatively, the anode current collector may be applied by evaporation. A suitable active material for the cathode layer is lithium nickel cobalt manganese oxide ($LiNiCoMnO_2$) and a suitable anode active material is lithium titanium oxide (LTO). This combination would result in a cell having a mean voltage of approximately 2.0V. Solid-state battery cell 220 is representative of the structure of an all-solid-state lithium ion battery cell with a cathode current collector/substrate 230, composite cathode 228, glass electrolyte coating 226, composite anode 224 and anode/anode current collector 222.

Figure 3:
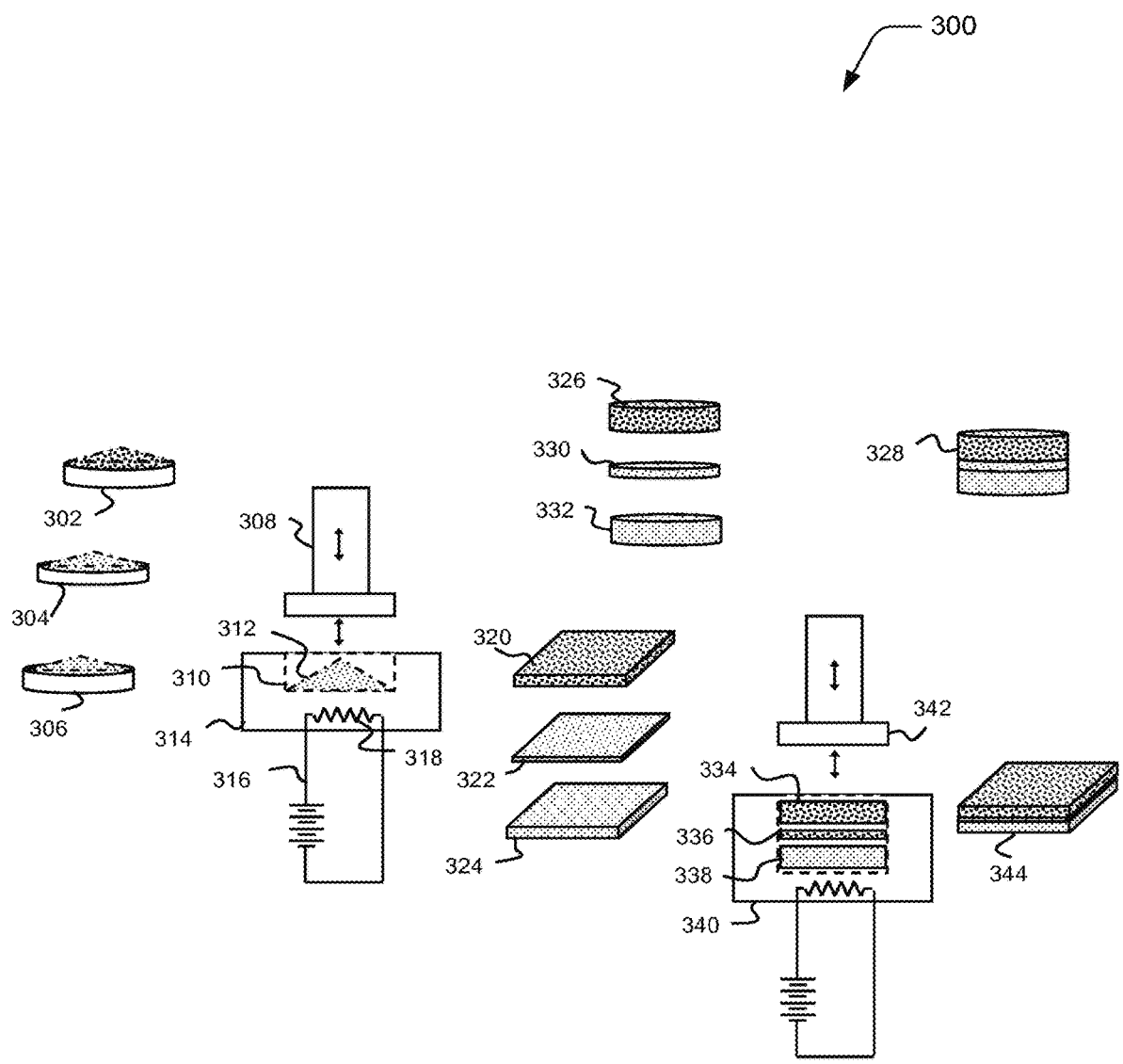
FIG. 3 illustrates an example construction of an all-solid-state lithium ion battery cell having an electrode formed by powder materials hot pressed into free standing pellets or wafers in one or more embodiments of a solid-state battery.

FIG. 3 illustrates an example 300 of constructing an all-solid-state lithium ion battery cell representative of hot pressed electrode powder construction in one or more embodiments of solid state batteries. The basic structure of the cell is similar to that of the cells depicted in FIGS. 1 and 2. However, in an embodiment, the electrode powder materials are hot pressed into free standing pellets or wafers as opposed to using a liquid carrier to make a slurry for casting onto a substrate. Cathode and anode pellets can be used to form batteries that have an integrated circuit chip or pellet like configuration. As in the case of the casted electrodes, the low melt temperature electrolyte performs the dual function of providing low interface impedance particle to particle ionic conduction and of bonding the constituent powders together. A measured amount of electrode or separator powder mixture is placed in a die and hot pressed at a temperature, approximately 300° C., which is sufficient to reflow the low temperature electrolyte component of the powder and bond the constituent powders together. The shape of the die and the amount of powder placed in the die determines the physical dimensions of the resulting pellet or wafer.

In FIG. 3, measured amounts of cathode powder mixture 302, separator powder 304, and active anode powder 306 are each individually placed at 312 inside cavity 310 of heated die 314, the die being heated by heating element 318 from power supply 316, and hot pressed by piston 308 to form the respective component layers of a battery cell. Dies can be configured to produce prismatic shaped cathode 324, prismatic shaped electrolyte separator 322, and prismatic shaped active anode 320. Similarly, dies could be configured to form disc shaped cell components as represented by cathode 326, separator 330, and anode 332 or even other configurations. The thickness of the component layers depends on the amount of powder used. The individual components 334, 336, and 338 may be placed together in a heated die such as illustrated by 340 and hot pressed by piston 342, where the components are fused together to form a complete cell structure. The cavity shape of die 340 is selected to make the desired shape of the cell component to form a prismatic shaped cell 344, a disc shaped cell 328 or other shapes. Anode and cathode current collectors may be vacuum evaporated or hot pressed as foils onto the anode and cathode surfaces of the cells.

Figure 4:
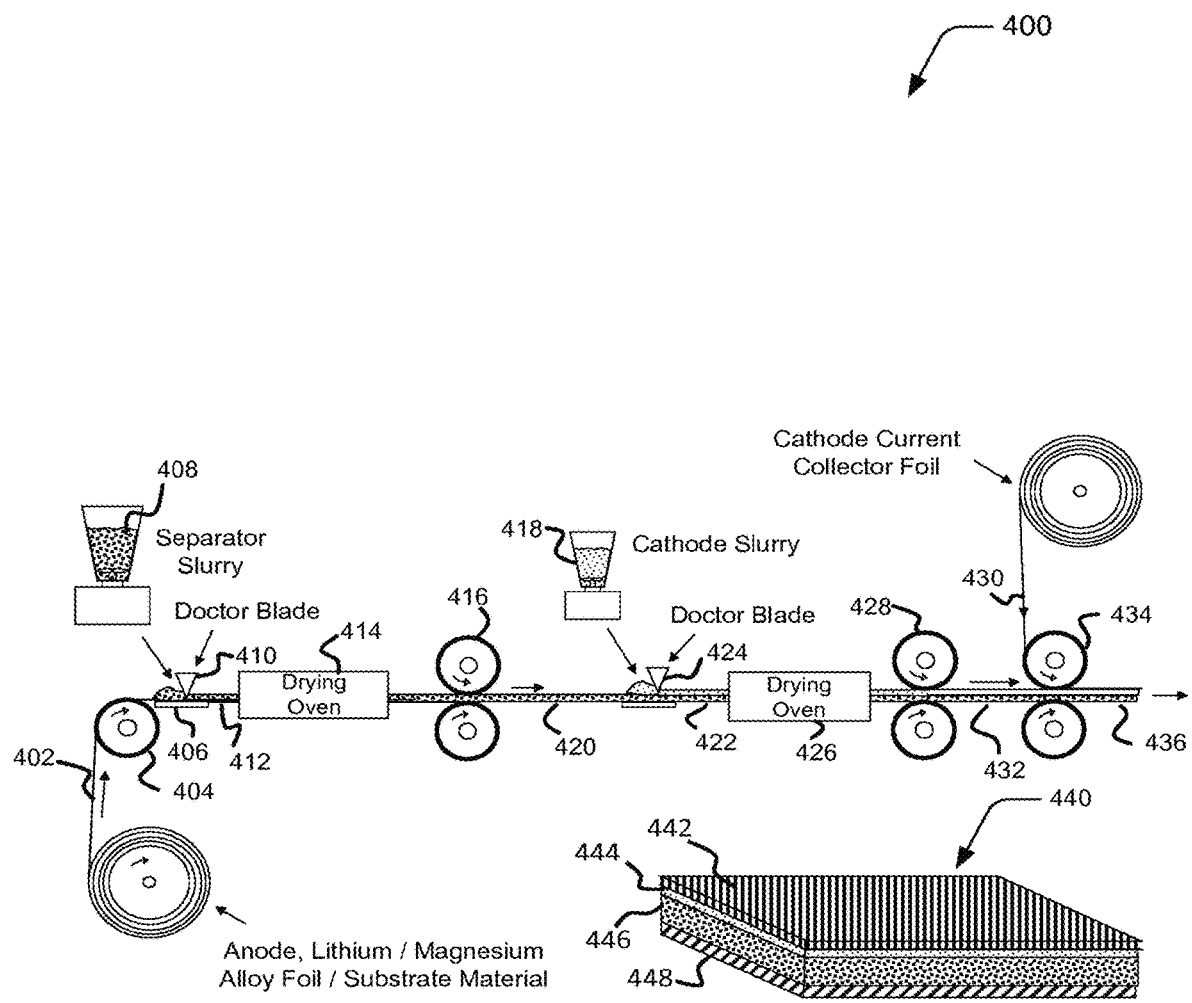
FIG. 4 illustrates an example construction of an all-solid-state lithium ion battery cell with a lithium magnesium alloy in one or more embodiments of a solid-state battery.

FIG. 4 illustrates an example 400 of an all-solid-state lithium ion battery cell in one or more embodiments of solid state batteries. A lithium magnesium alloy can be employed as a substrate and anode. The lithium magnesium alloy foil 402 passes over roller 404 and onto casting table 406. A doctor blade 410 is used to cast electrolyte separator material 408 onto lithium magnesium foil 402. The coated foil 412 passes through dryer oven 414 where the carrier liquid is removed by evaporation and the casting is preheated prior to passing on to hot rollers 416. After drying and hot rolling to reflow the meltable portion of the electrolyte and form a continuous coating, doctor blade 424 is used to apply cathode coating material 418 on top of the electrolyte separator layer of anode-separator casting 420. The anode, separator, cathode stack 422 is dried in drying oven 426 and hot rolled with hot rollers 428. Then the cell structure is completed by applying a current collector foil layer 430 to the completed anode, separator, cathode stack 432 with hot rollers 434 to bond together the completed cell casting 436. Note that an anode having a solid electrolyte coating applied thereto could be useful in other types of batteries, including those that employ an organic electrolyte such as a liquid or polymer. Solid-state battery cell 440 is representative of the structure of an all-solid-state lithium battery cell with a lithium magnesium alloy anode/substrate 448, composite cathode 446, glass electrolyte coating 444, and a cathode current collector 442. The foil 402 may be a non-active material such as copper foil. In such an embodiment, the lithium anode is formed during the first charge cycle.

Figure 5:
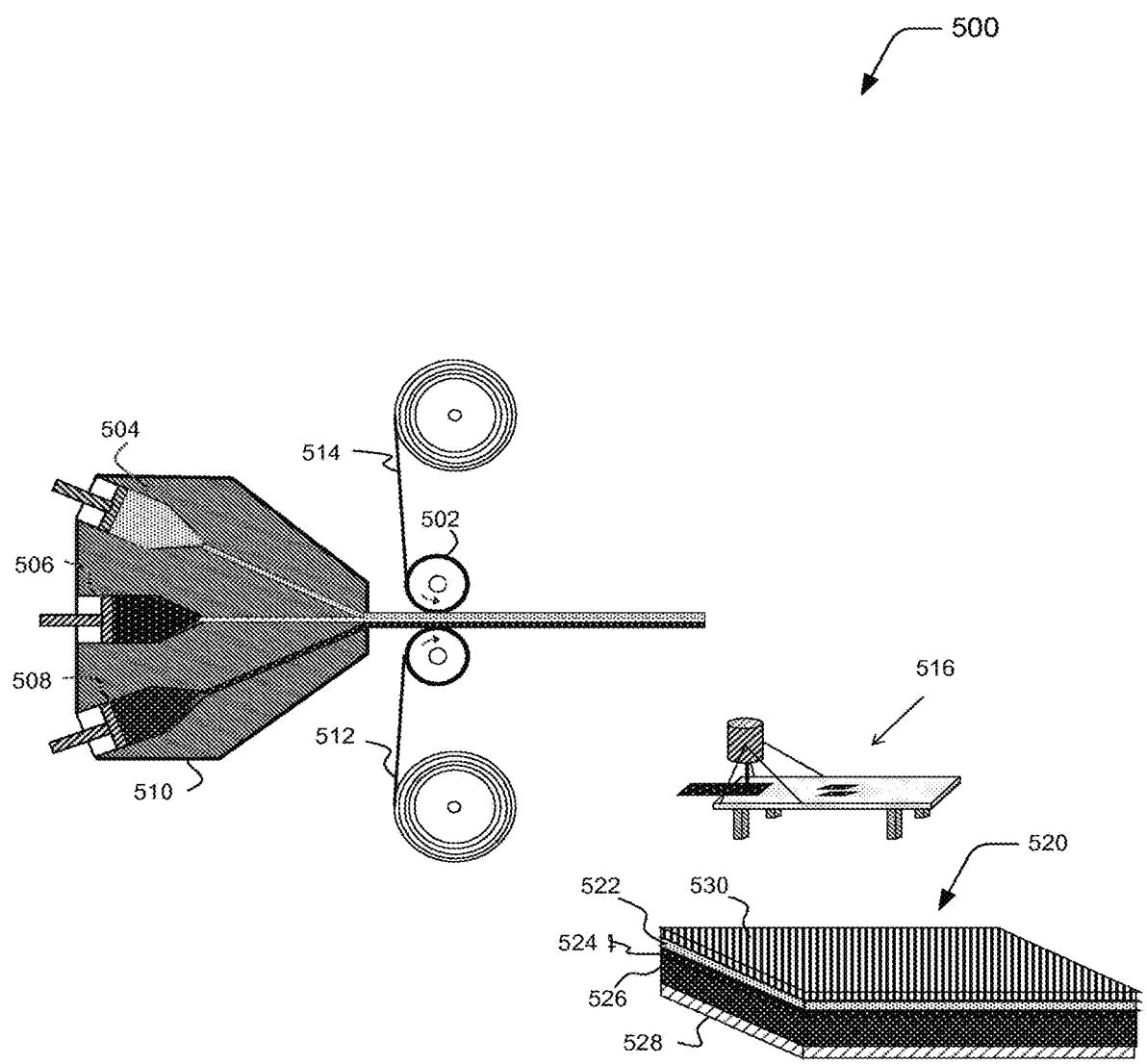
FIG. 5 illustrates an example construction of an all-solid-state lithium ion battery cell with coextruded cathode, separator, and anode material in one or more embodiments of a solid-state battery.

FIG. 5 illustrates an example 500 of an all-solid-state lithium ion battery cell in one or more embodiments of solid state batteries. The example 500 illustrates co-extrusion of the cathode material 508, separator material 506, and anode material 504 using extrusion die 510. The extruded material is supplied to hot rollers 502 where cathode current collector 512 and anode current collector 514 are laminated onto the resulting battery structure. The continuous web of battery structure is subsequently cut into individual battery cells as illustrated by laser cutting table 516. Solid-state battery cell 520 is representative of the structure of an all-solid-state lithium ion battery cell with a cathode current collector/substrate 528, composite cathode 526, separator material 524, composite anode 522, and anode current collector 530.

Figure 6:
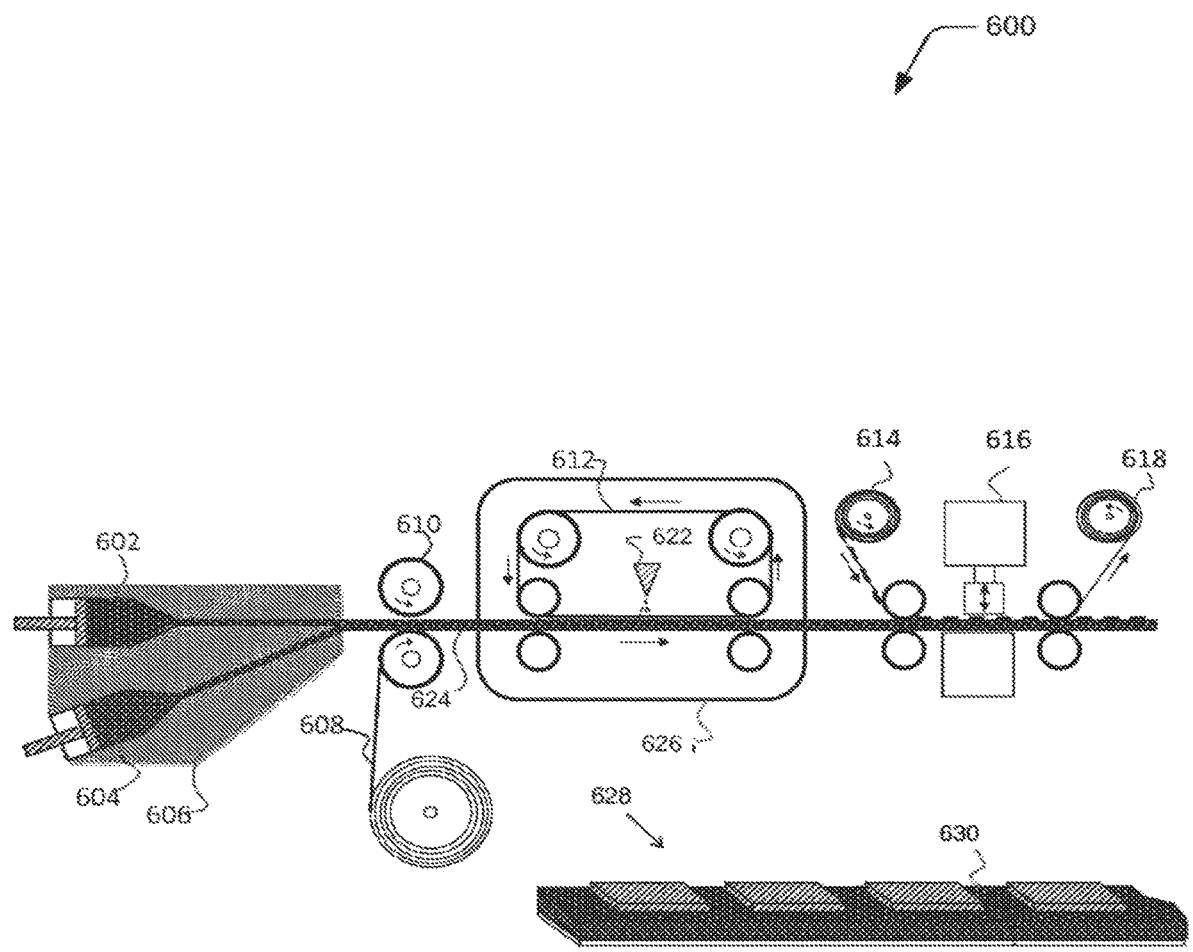
FIG. 6 illustrates an example construction of an all-solid-state lithium ion battery cell with coextruded cathode and separator material in one or more embodiments of a solid-state battery.

FIG. 6 illustrates an example 600 of an all-solid-state lithium ion battery cell in one or more embodiments of solid state batteries. The example 600 illustrates the use of die 606 to co-extrude cathode material 604 and separator material 602. Cathode current collector 608 is laminated onto the cathode side of the cathode separator structure by hot rollers 610. Anode deposition chamber 626 applies an anode coating to the surface of the separator of the cathode-separator stack 624 by evaporation using evaporator 622. Continuous mask 612 is configured having a series of open window areas that determine the deposition pattern of the evaporated lithium. It moves above the surface of the extruded cathode/separator at the same speed so as to define specific areas of the separator surface on which the anode material will deposit. Battery structure 628 illustrates an example of a series of anodes applied along the separator surface. Such a patterned deposition simplifies cutting the continuous web into individual cells. For example, the cells can be cut between individual cells as illustrated by dotted line 630 without concern about short circuiting the anode to the cathode along the cut line.

Hot press 616 is utilized for thermal lamination of precut anode current collectors onto the surface of the separator. The anode current collectors are conveyed from a supply reel 614 through hot press 616, where they are laminated to the separator, with the leftover carrier tape for the precut anode current collectors captured by take-up spool 618. The evaporation and thermal lamination may be performed in series, where the evaporated lithium functions as a wetting layer to enhance the bonding of the subsequent thermally bonded anode current collector structure. The thermally bonded anode structure may be lithium, copper, or other suitable material. Evaporation chamber 626 may alternatively apply copper as an anode structure as opposed to a lithium layer. The copper would function as a current collector whereby lithium would evolve as an anode as it is plated from the cathode on first charge.

Figure 7:
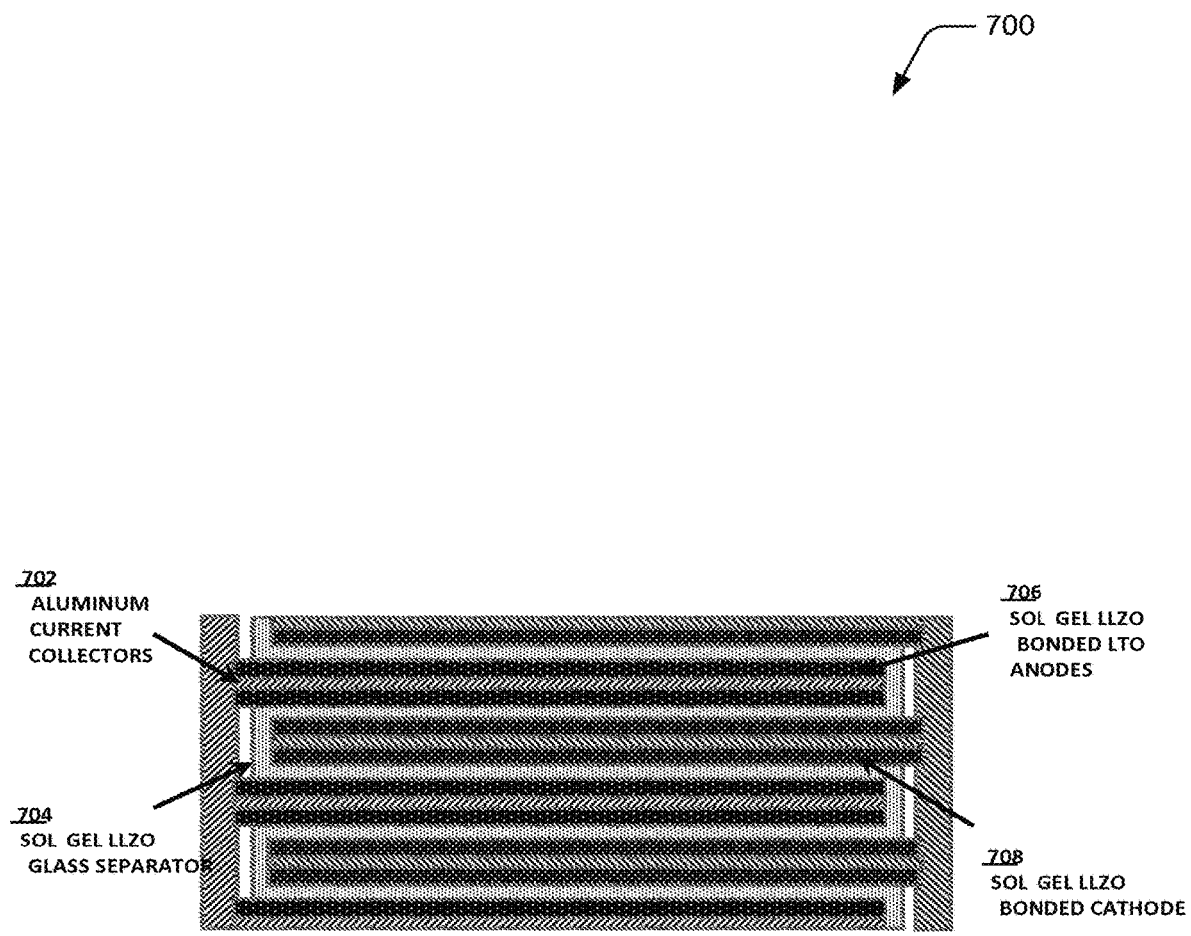
FIG. 7 illustrates an example construction of an all-solid-state lithium ion battery with multiple cells in one or more embodiments of a solid-state battery.

FIG. 7 illustrates an example 700 of an all-solid-state lithium ion battery constructed with multiple cells, which are constructed with aluminum current collectors 702, sol gel LLZO glass separators 704, sol gel LLZO bonded LTO anodes 706, and sol gel LLZO bonded cathodes 708. The example all-solid-state battery can be constructed using a series of alternating layers of cathode, cathode current collector, cathode, separator, anode, anode current collector, anode, separator, cathode and so on.

CONCLUSION

Implementations of electrodes for rechargeable solid-state batteries are described. In at least some embodiments, electrodes are fabricated from electrochemically active powder material and meltable inorganic solid electrolyte. The meltable inorganic solid electrolyte is configured to bond together the electrochemically active powder material to form the electrode.

Implementations of separators for rechargeable solid-state batteries are described. In at least some embodiments, separators are fabricated from high ionic, conductive filler powder and meltable inorganic solid electrolyte. The meltable inorganic solid electrolyte is configured to bond together the high ionic, conductive filler powder to form the separator.

Implementations for methods of fabricating rechargeable solid-state batteries are described. In at least some embodiments, batteries are fabricated from a cathode current collector foil substrate by roll casting a cathode slurry on the cathode current collector foil substrate.

Implementations for methods of fabricating rechargeable solid-state batteries are described. In other embodiments, batteries are fabricated by coextruding cathode material and separator material and laminating a cathode current collector foil to the cathode material by hot press rolling.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

The invention claimed is:

1. A method of preparing a solid-state electrolyte (SSE) containing no liquid electrolyte, the method comprising:
   mixing a plurality of powder constituents selected from the group consisting of $LiNO_3$—$Al_2O_3$, $Li_2O$—$MoO_3$, $Li_2O$—$WO_3$, $LiBr$—$Li_2O$—$WO_3$, and $LiBr$—$Li_2O$—$B_2O_3$—$P_2O_5$;
   pressing or rolling the plurality of powder constituents at an elevated temperature sufficient to soften or melt the plurality of powder constituents;
   cooling the plurality of powder constituents beneath the elevated temperature; and
   re-hardening the plurality of powder constituents based on cooling to bind the plurality of powder constituents together.

2. A method of manufacturing an all-solid-state battery containing no liquid electrolyte, the method comprising:
   forming a cathode;
   forming a separator on the cathode; and
   forming an anode on the separator,
   wherein the separator includes a solid, softened, and re-hardened inorganic electrolyte selected from the group consisting of $LiNO_3$—$Al_2O_3$, $Li_2O$—$MoO_3$, $Li_2O$—$WO_3$, $LiBr$—$Li_2O$—$WO_3$, and $LiBr$—$Li_2O$—$B_2O_3$—$P_2O_5$.

3. A method of manufacturing an all-solid-state lithium battery that contains no liquid electrolyte, all-solid-state lithium battery comprising an anode including an anode active material, a solid electrolyte separator formed on a surface of the anode, and a cathode formed on a surface of the solid electrolyte separator opposite the anode, the method comprising:
   (a) coating an anode slurry on a foil substrate by feeding the foil substrate over a roller onto a casting table as the foil substrate passes along the casting table, wherein the foil substrate is an anode current collector;
   (b) controlling a thickness of an anode coating layer formed by step (a) on the foil substrate;
   (c) drying a coated substrate formed by steps (a) and (b) by passing the coated substrate along the casting table to a first dryer oven to be dried by evaporation;
   (d) passing the coated substrate through a first set of heated rollers followed by cooling to form an anode coating structure;
   (e) coating an electrolyte separator slurry to form an electrolyte separator on a surface of the anode by passing the cathode along the casting table;

(f) controlling a thickness of an electrolyte separator formed by step (e) on the anode to form a multilayer structure;
(g) drying the multilayer structure formed in step (f) by passing the multilayer structure along the casting table to a second dryer oven to be dried by evaporation;
(h) passing a dried multilayer structure formed in step (g) through a second set of heated rollers to melt and bond at least the electrolyte separator formed in step (e) to the anode and form the solid electrolyte separator on the surface of the anode upon cooling,
wherein the solid electrolyte separator includes a solid, softened, and re-hardened inorganic electrolyte selected from the group consisting of $LiNO_3$—$Al_2O_3$, $Li_2O$—$MoO_3$, $Li_2O$—$WO_3$, $LiBr$—$Li_2O$—$WO_3$, and $LiBr$—$Li_2O$—$B_2O_3$—$P_2O_5$; and
(i) forming a cathode current collector on a surface of the solid electrolyte separator opposite the anode by feeding an cathode current collector foil to be pressed and bonded to the surface of the solid electrolyte separator as the multilayer structure passes along the casting table to a third set of heated rollers to form a completed cell casting of all-solid-state lithium battery,
wherein in step (a), the anode slurry is premixed by milling and comprises a first carrier liquid, an anode active material powder, and at least one of a first electrolyte powder, a second electrolyte powder, and an electrically conductive powder,
wherein in steps (b) and (f), the thicknesses of the anode slurry and the electrolyte separator slurry are controlled by passing the coated substrate formed in step (c) through respective doctor blades,
wherein in step (d), the first set of rollers are heated to a melt temperature of the first electrolyte powder to melt and bond the first electrolyte powder with the anode active material,
wherein in step (e), the electrolyte separator slurry comprises a second carrier liquid and at least one of the first electrolyte powder and the second electrolyte powder; and
wherein in step (h) the second set of rollers are heated to the melt temperature of at least one of the first electrolyte powder and the second electrolyte powder.

4. A method of manufacturing an all-solid-state lithium battery comprising a cathode including a cathode active material, a solid electrolyte separator formed on a surface of the cathode, and an anode formed on a surface of the solid electrolyte separator opposite the cathode, the method comprising:
(a) coating a cathode slurry on a foil substrate by feeding the foil substrate over a roller onto a casting table as the foil substrate passes along the casting table, wherein the foil substrate is a cathode current collector;
(b) controlling a thickness of a cathode coating layer formed by step (a) on the foil substrate;
(c) drying a coated substrate formed by steps (a) and (b) by passing the coated substrate along the casting table to a first dryer oven to be dried by evaporation;
(d) passing the coated substrate through a first set of heated rollers followed by cooling to form a cathode coating structure;
(e) coating an electrolyte separator slurry to form an electrolyte separator on a surface of the cathode by passing the cathode coating structure along the casting table;
(f) controlling a thickness of the electrolyte separator formed by step (e) on the cathode to form a first multilayer structure;
(g) drying the first multilayer structure formed in step (f) by passing the first multilayer structure along the casting table to a second dryer oven to be dried by evaporation;
(h) passing a first dried multilayer structure formed in step (g) through a second set of heated rollers to melt and bond at least the electrolyte separator formed in step (e) to the cathode and form the solid electrolyte separator on the surface of the cathode upon cooling,
wherein the solid electrolyte separator includes a solid, softened, and re-hardened inorganic electrolyte selected from the group consisting of $LiNO_3$—$Al_2O_3$, $Li_2O$—$MoO_3$, $Li_2O$—$WO_3$, $LiBr$—$Li_2O$—$WO_3$, and $LiBr$—$Li_2O$—$B_2O_3$—$P_2O_5$; and
(i) forming an anode current collector on the solid electrolyte separator opposite the cathode by feeding an anode current collector foil to be pressed and bonded to the surface of the solid electrolyte separator as the first dried multilayer structure passes along the casting table to a third set of heated rollers to form a completed cell casting of all-solid-state lithium battery,
wherein in step (a), the cathode slurry is premixed by milling and comprises a first carrier liquid, a cathode active material powder, and at least one of a first electrolyte powder, a second electrolyte powder, and an electrically conductive powder,
wherein in steps (b) and (f), the thicknesses of the cathode slurry and the electrolyte separator slurry are controlled by passing the coated substrate formed in step (c) through respective doctor blades,
wherein in step (d), the first set of rollers are heated to a melt temperature of the first electrolyte powder to melt and bond the first electrolyte powder with the cathode active material,
wherein in step (e), the electrolyte separator slurry comprises a second carrier liquid and at least one of the first electrolyte powder and the second electrolyte powder; and
wherein in step (h) the second set of rollers are heated to the melt temperature of at least one of the first electrolyte powder and the second electrolyte powder.

5. The method of claim 4, wherein at least one of the first carrier liquid and the second carrier liquid is acetonitrile.

6. The method of claim 4, wherein the second electrolyte powder has a conductivity of greater than $10^{-6}$ S/cm and is selected from the group consisting of a lithium germanium phosphorous sulfide based electrolyte material, a lithium lanthanum zirconium oxide based electrolyte material, a lithium lanthanum titanium oxide based electrolyte material, LiSiCON, and a polymer electrolyte material.

7. The method of claim 4, wherein the electrically conductive powder comprises carbon black or carbon nanotubes.

8. The method of claim 4, wherein the cathode coating structure further comprises a polymer electrolyte configured to bond the cathode coating structure together.

9. The method of claim 4, wherein the cathode includes a lithium metal-oxide active material.

10. The method of claim 9, wherein the cathode active material comprises lithium nickel manganese cobalt oxide.

11. The method of claim 4, further comprising:
coating an anode slurry comprising an anode active material on the surface of the solid electrolyte separator opposite the cathode to form an anode coating layer and a second multilayer structure as the first multilayer structure passes along the casting table;

controlling a thickness of the anode slurry;

drying the second multilayer structure to form a second dried multilayer structure by passing the second multilayer structure along the casting table to a third dryer oven to be dried by evaporation; and passing the second dried multilayer structure through a fourth set of heated rollers to melt and bond the anode coating layer to the solid electrolyte separator prior to press bonding the anode current collector foil to the anode coating layer.

12. The method of claim 11, wherein the anode active material comprises lithium titanium oxide.

13. The method of claim 4, wherein the electrolyte separator slurry further comprises a lithium phosphorous sulfide based conductive electrolyte material including $Li_{10}GeP_2S_{12}$.

14. The method of claim 13, wherein the lithium phosphorous sulfide based conductive electrolyte material comprises $Li_{10}GeP_2S_{12}$.

* * * * *